United States Patent
Yoshida et al.

(10) Patent No.: US 7,426,658 B2
(45) Date of Patent: Sep. 16, 2008

(54) DATA STORAGE SYSTEM AND LOG DATA EQUALIZATION CONTROL METHOD FOR STORAGE CONTROL APPARATUS

(75) Inventors: Masahiro Yoshida, Kawasaki (JP); Takeshi Obata, Kawasaki (JP); Taichi Oono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 265 days.

(21) Appl. No.: 11/231,932

(22) Filed: Sep. 22, 2005

(65) Prior Publication Data
US 2006/0218345 A1    Sep. 28, 2006

(30) Foreign Application Priority Data
Mar. 24, 2005    (JP) ............................. 2005-085286

(51) Int. Cl.
*G06F 12/08*    (2006.01)
(52) U.S. Cl. ........................ 714/20; 714/15; 711/114; 711/113
(58) Field of Classification Search ....................... None
See application file for complete search history.

(56) References Cited
U.S. PATENT DOCUMENTS
2005/0251625 A1 *   11/2005   Nagae et al. ................. 711/129

FOREIGN PATENT DOCUMENTS
JP    2000-293389    10/2000
JP    2003-316525    11/2003

* cited by examiner

*Primary Examiner*—B. James Peikari
(74) *Attorney, Agent, or Firm*—Staas & Halsey LLP

(57) ABSTRACT

A storage system have a plurality of control modules which control a plurality of disk storage devices. In order to read/write system information even when problems arise in paths with the plurality of disk devices, and moreover to output log data even upon occurrence of an abnormality in the control module, a plurality of control modules which control a plurality of disk storage devices, each have a built-in system disk device unit which stores log data. In equalization processing, log data of one control module is stored in a system disk of another installed control module. Even when an abnormality occurs in the one control module, log data of the one control module can be output by the other control module.

16 Claims, 20 Drawing Sheets

| CM NUMBER | BACKUP CM |
|---|---|
| CM-0 | CM-1 |
| CM-1 | CM-2 |
| CM-2 | CM-3 |
| CM-3 | CM-0 |

470-1

DATA STORAGE SYSTEM AND LOG DATA EQUALIZATION CONTROL METHOD FOR STORAGE CONTROL APPARATUS

CROSS-REFERENCE TO RELATED APPLICATIONS

This application is based upon and claims the benefit of priority from the prior Japanese Patent Application No. 2005-085286, filed on Mar. 24, 2005, the entire contents of which are incorporated herein by reference.

BACKGROUND OF THE INVENTION

1. Field of the Invention

This invention relates to a data storage system used as an external storage apparatus for a computer and to a log data equalization control method for a storage control apparatus, and in particular relates to a data storage system having, among numerous disk devices, disk devices used by users and a system disk device used by the apparatus, and to a log data equalization control method for a storage control apparatus.

2. Description of the Related Art

As data has assumed various electronic forms in recent years and has come to be handled by computers, independently of host computers executing data processing, data storage apparatuses (external storage apparatuses) capable of storing large amounts of data efficiently and with high reliability have become increasingly important.

As such data storage systems, disk array apparatuses having large-capacity disk devices (for example, magnetic disk and optical disc devices) and disk controllers used to control such large-capacity disk devices have come into use. Such a disk array apparatus has memory serving as a disk cache. By this means, when read requests and write requests are received from a host computer, the time required to access data can be shortened, and enhanced performance can be achieved.

In general, a disk array apparatus has a plurality of principal units, that is, a channel adapter which is a portion for connection to host computers, a disk adapter which is a portion for connection to disk drives, a memory having a cache area, a control portion which serves to control the cache memory, and large-capacity disk drives.

FIG. 25 explains the technology of the prior art. The disk array apparatus 102 shown in FIG. 25 has two control managers (memory, including cache memory, and a control unit) 10 and each control manager 10 is connected to channel adapters 11 and disk adapters 13.

The two control managers 10, 10 are directly connected by a bus 10c so as to enable communication. The channel adapters 11 are connected to host computers (not shown) by for example fiber channel or Ethernet (a registered trademark). The disk adapters 13 are connected to each of the disk drives in disk enclosures 12 by, for example, fiber channel cable.

A disk enclosure 12 has two ports (for example, fiber channel ports); these two ports are connected to different disk adapters 13. By this means redundancy is imparted, and fault tolerance is improved. (See for example Japanese Patent Laid-open No. 2001-256003)

In such a large-capacity data storage system, a large amount of information (called system information) is necessary for control by controllers (control units, channel adapters, disk adapters and similar). For example, system information includes firmware necessary to operate controllers, backup data for the apparatus configuration, and log data for various tasks and threads.

The firmware is control programs for controllers; in particular, in a disk array (RAID configuration), numerous control programs are necessary. Backup data for the apparatus configuration is data used to convert from host-side logical addresses to physical disk addresses and is necessary a large amount of data, according to the number of disk devices and number of hosts. Log data is state data for each task and thread, used for fault recovery and fault prevention, and also constitutes a large volume of data.

Such system data is generally stored in a nonvolatile large-capacity storage device. In the prior art, as shown in FIG. 25, a portion of the disk drives 120 in the disk enclosure 12 connected by cables to the disk adapters 13 was used for storage of such data. A disk drive which stores this system data is called a system disk.

That is, a portion of the numerous disk drives connected to controllers are used as system disks, and the other disk drives are used as user disks. As a consequence of this conventional technology, as indicated in FIG. 25, any of the controllers 10 can access system disks 120.

However, in addition to redundancy, in recent years storage systems have been required to continue operation even upon occurrence of a fault in any portion of the system. In the technology of the prior art, if a problem arises in the path between a controller and a disk enclosure, such as for example between a disk adapter and a disk enclosure, reading and writing of a system disk 120 can no longer be executed.

Consequently even if the controller and other paths are normal, the controller cannot read firmware or apparatus configuration backup data from the system disk, and operations using other routes become difficult. Further, the controller cannot read or write log data to and from the system disk, impeding analysis upon occurrence of a fault and diagnostics for fault prevention.

Moreover, upon occurrence of a power outage it is necessary to switch to battery operation and to back up the data in the cache memory to the system disk. In the technology of the prior art, in such cases power must also be supplied to the disk enclosure, so that a very large battery capacity is required. Further, a comparatively long time is necessary to write backup data to a system disk via a disk adapter and cable, and when the cache memory capacity is large, a huge battery capacity is required.

SUMMARY OF THE INVENTION

Hence an object of this invention is to provide a data storage system and log data equalization control method for a storage control apparatus, in order that, even if problems arise in a path between a controller and a disk drive group, reading and writing of the system disk can be executed, and upon occurrence of an abnormality in one controller, the log data of the system disk of the controller are backed up by another controller.

A further object of this invention is to provide a data storage system and log data equalization control method for a storage control apparatus, to enable an inexpensive configuration with a reduced battery capacity for battery backup upon occurrence of a power outage, and, upon occurrence of an abnormality in one controller, to enable backup of the log data of the system disk of the controller using another controller.

Still another object of this invention is to provide a data storage system and log data equalization control method for a storage control apparatus, such that data in cache memory can be backed up with a small battery capacity upon occurrence of a power outage, and such that even if an abnormality occurs in one controller, the log data of system disk of the controller can be backed up using another controller.

In order to attain these objects, a data storage system of this invention has a plurality of disk storage devices which store data and a plurality of control modules, connected to the plurality of disk storage devices, which control access to the disk storage devices, according to access instructions from a higher-level device. And each of the control modules has memory having a cache area which stores a portion of the data stored in the disk storage devices, a control unit which performs access control, a first interface unit which controls the interface with the higher-level device, a second interface unit which controls the interface with the plurality of disk storage devices, and a system disk unit, connected to the control unit, which stores, at least, log data of the control unit. Furthermore, one control module transfers the log data of the system disk unit to another control module and stores the data in the system disk unit of the other control module to execute log data equalization control.

Further, a log data equalization control method of this invention is a log data equalization control method for a storage control apparatus having a plurality of control modules, connected to a plurality of disk storage devices which store data, which control access to the disk storage devices, according to access instructions from a higher-level system; each of the control modules has memory having a cache area which stores a portion of the data stored in the disk storage devices, a control unit which controls access, a first interface portion which controls the interface with the higher-level system, a second interface portion which controls the interface with the plurality of disk storage devices, and a system disk unit, connected to the control unit, which stores, at least, log data of the control unit. This control method has a step of transferring the log data of the system disk unit of the one control module to another control module, and a step of storing the transferred log data in the system disk unit of the other control module to execute log data equalization control.

In this invention, it is preferable that the one control module receives log data of the system disk unit of the other control module, and store the log data of the other control module in the system disk unit of the one control module.

In this invention, it is preferable that each of the control modules distributes the log data of the system disk unit of the control module to the plurality of other control modules, and that each the control module stores log data of all control modules in the system disk unit of the each control module.

In this invention, it is preferable that the plurality of control modules comprise four or more control modules, and that each control module store, in the system disk unit of each control module, its own log data, and the log data of control module which is the backup destination.

In this invention, it is preferable that of the above four or more control modules, one control module detects anomalies in one other control modules, searches for the equalization destination and equalization source for its own log data stored in the system disk unit of the one other control modules and the log data of the control module which is the backup destination, determines the distribution source and also determines the distribution destination from the backup destination, distributes its own log data stored on the system disk unit of the one other control module and a copy of the log data of the control module which is the backup destination from the distribution source control module to the distribution destination control module, and stores this data in the system disk unit of the control module.

In this invention, it is preferable that the one control module, upon storing the log data in the system disk unit of the one control module, execute equalization processing comprising transfer of log data to the other control modules.

In this invention, it is preferable that the one control module store the log data of the one control module in its own log data area of the system disk unit, and store the log data of the one control module and the log data of other control modules in a log data area for equalization of the system disk unit.

In this invention, it is preferable that the one control module read its own log data from the system disk unit of the one control module to a buffer area in memory and transfer the log data to a buffer area in memory of another control module, and that the other control module write the log data for the one control module in the memory buffer area to the system disk drive.

A system disk is built into the control module, so that even if a problem arises in a path between the control module and disk storage devices, if the control module and other paths are normal, the control module can read firmware and apparatus configuration backup data from the system disk, and operations using other paths are possible; moreover, log data can be read and written, so that analysis upon occurrence of a fault and diagnostics for fault prevention are possible.

Further, when in the event of a power outage the power is switched to batteries and the data in cache memory is backed up to a system disk, there is no need to supply power to a connected disk storage device, so that the battery capacity can be made small.

And, a system disk is built into the control module, and log data for the one control module is stored in the system disks of other installed control modules in equalization processing, so that even if an abnormality occurs in one control module, the log data of the one control module can be output by other control modules.

DESCRIPTION OF THE PREFERRED EMBODIMENTS

Below, embodiments of the invention are explained, in the order of a data storage system, read/write processing, mounted configuration, first embodiment of log data equalization processing, second embodiment of log data equalization processing, third embodiment of log data equalization processing, and other embodiments.

Data Storage System

Figure 1:
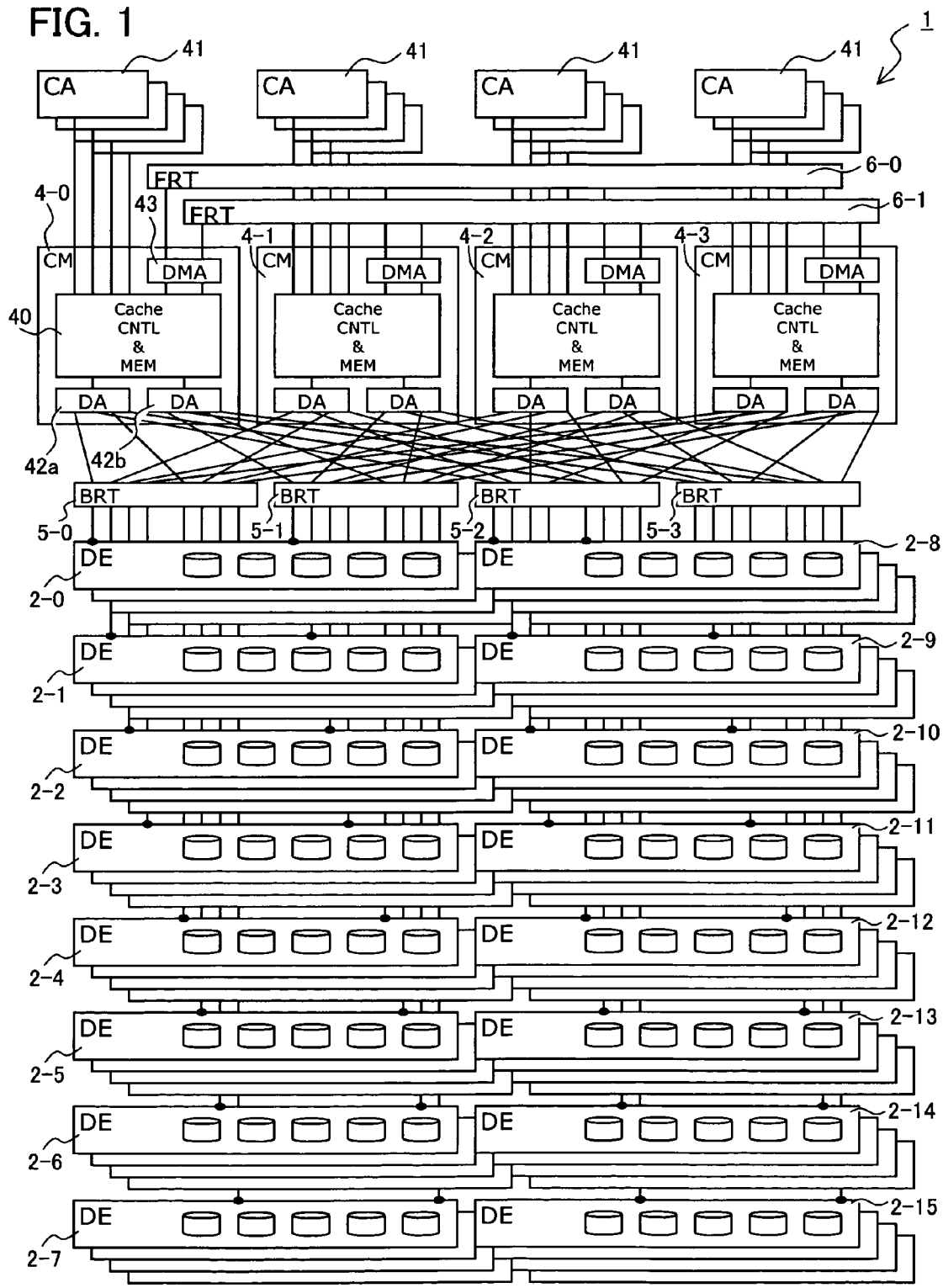
FIG. 1 shows the configuration of the data storage system of one embodiment of the invention.
Figure 2:
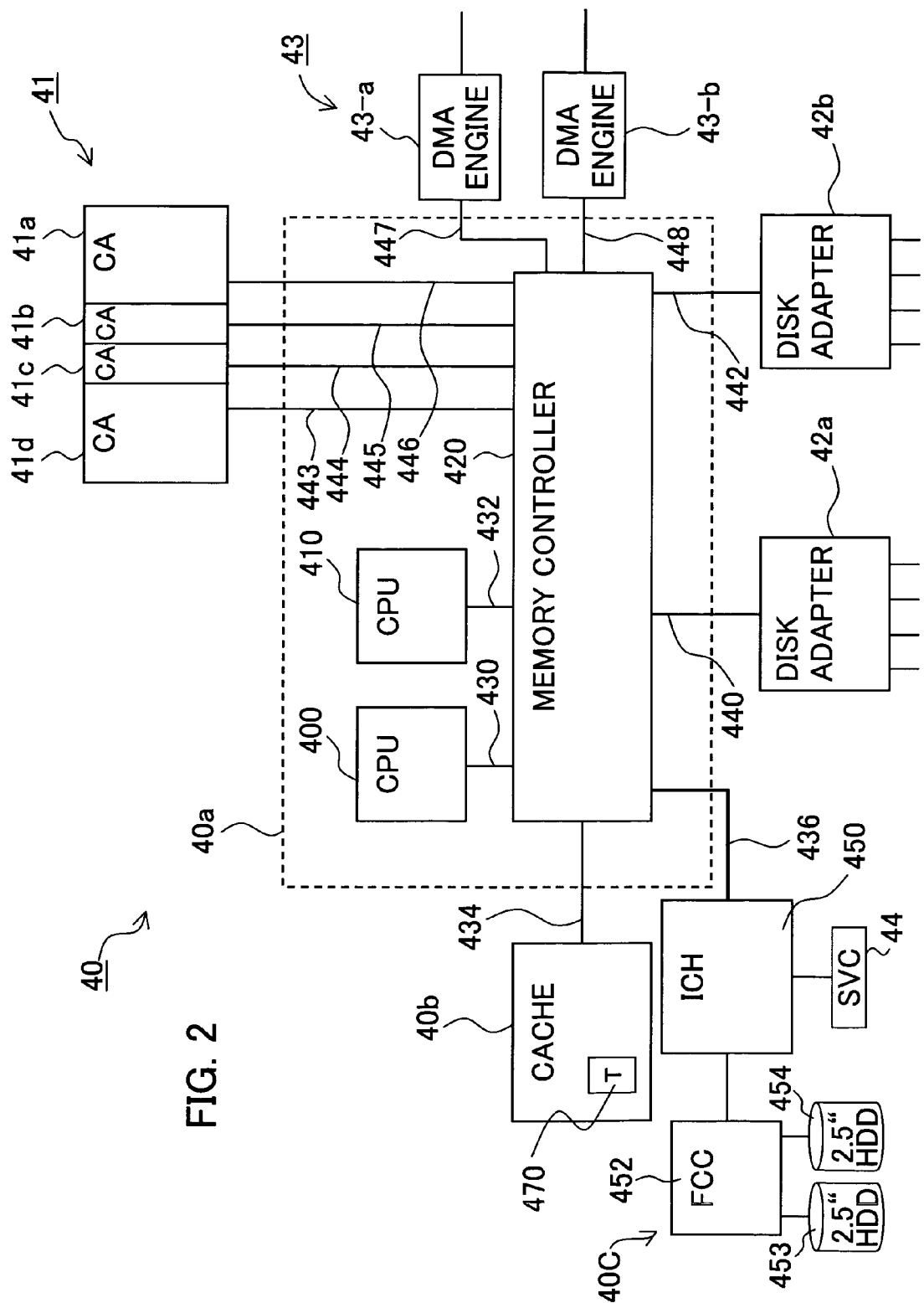
FIG. 2 shows the configuration of a control module in FIG. 1.
Figure 3:
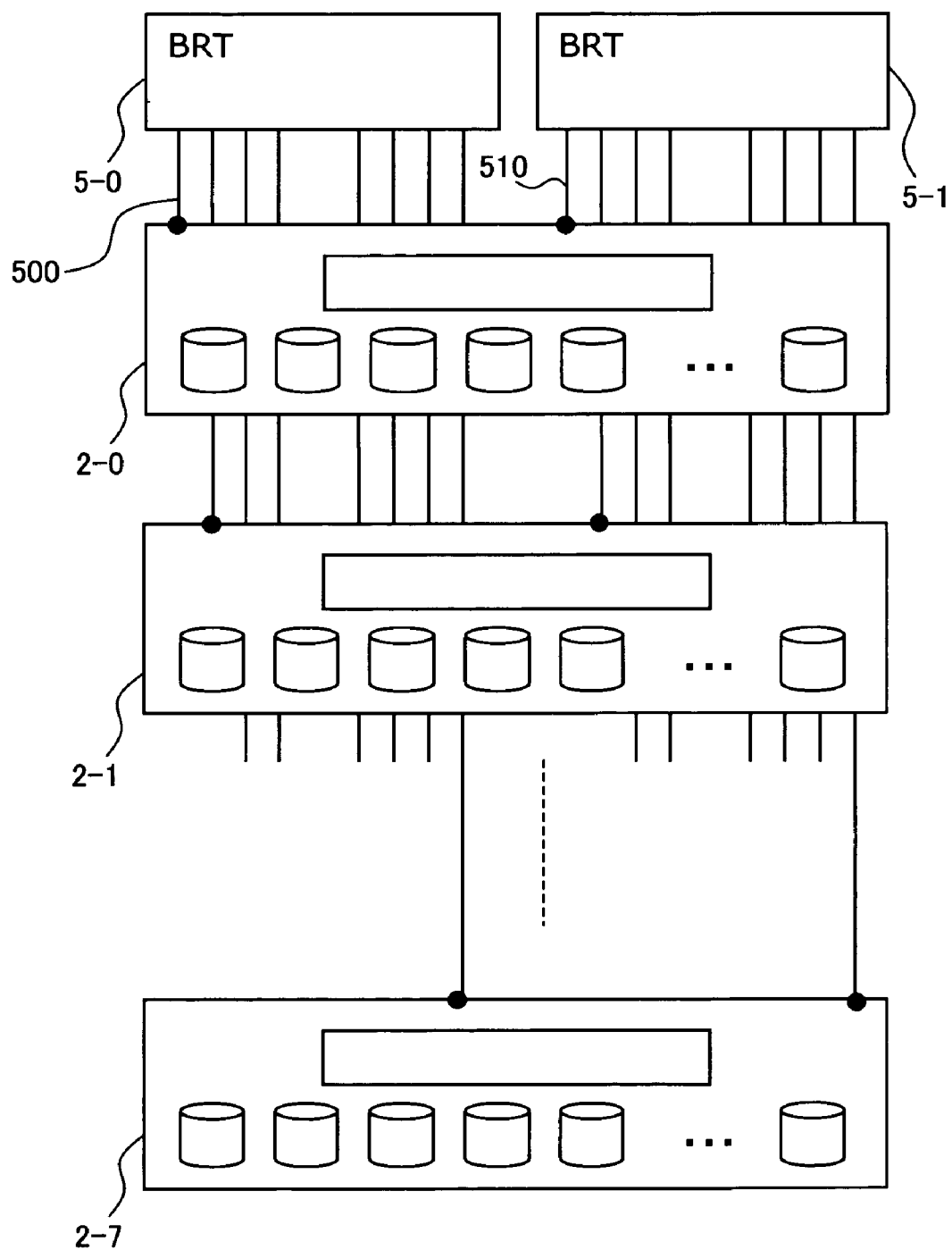
FIG. 3 shows the configuration of a back-end router and disk enclosure in FIG. 1 and FIG. 2.
Figure 4:
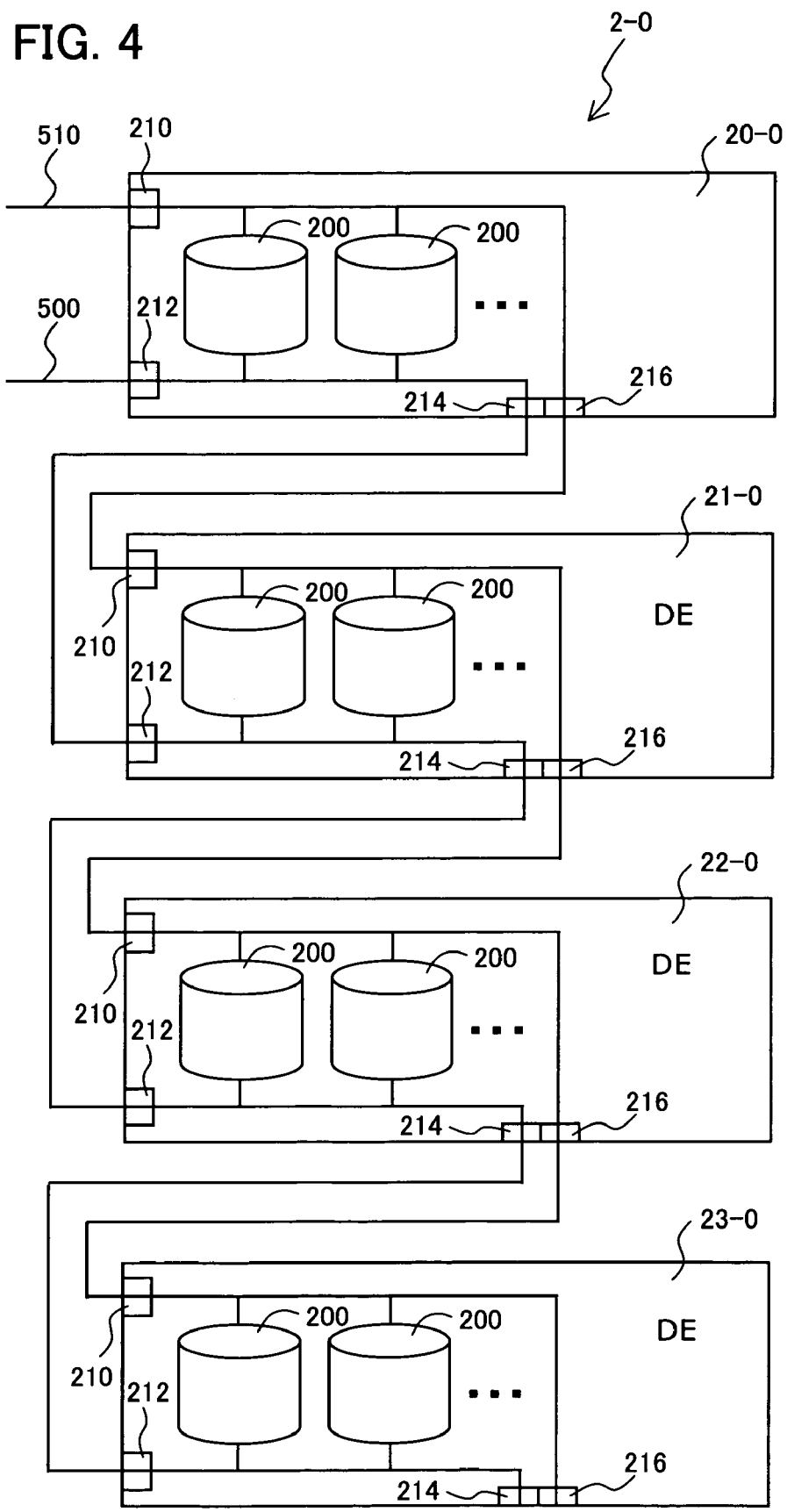
FIG. 4 shows the configuration of a disk enclosure in FIG. 1 and FIG. 3.

FIG. 1 shows the configuration of the data storage system of one embodiment of the invention, FIG. 2 shows the configuration of a control module in FIG. 1, FIG. 3 shows the configuration of a back-end router and disk enclosure in FIG. 1, and FIG. 4 shows the configuration of a disk enclosure in FIG. 1 and FIG. 3.

FIG. 1 shows a mid-scale disk array apparatus having four control modules, as an example of a data storage system. As shown in FIG. 1, the disk array apparatus 1 has a plurality of disk enclosures 2-0 to 2-15 holding data; a plurality (here, four) of control modules 4-0 to 4-3, positioned between a host computer (data processing system), not shown, and the plurality of disk enclosures 2-0 to 2-15; a plurality of back-end routers (first switch units; hereafter "BRTs") 5-0 to 5-3, provided between the plurality of control modules 4-0 to 4-3 and the plurality of disk enclosures 2-0 to 2-15; and a plurality (here, two) of front-end routers (second switch units; hereafter "FRTs") 6-0 and 6-1.

Each of the control modules 4-0 to 4-3 has a controller 40, a channel adapter (first interface portion; hereafter "CA") 41, disk adapters (second interface portions; hereafter "DAs") 42a, 42b, and a DMA (Direct Memory Access) engine (communication portion; hereafter "DMA") 43.

In FIG. 1, to simplify the drawing, the controller symbol "40", disk adapter symbols "42a" and "42b", and DMA symbol "43" are assigned only to the control module 4-0, and symbols are omitted for the constituent components of the other control modules 4-1 to 4-3.

The control modules 4-0 to 4-3 are explained using FIG. 2. The controllers 40 perform read/write processing based on processing requests (read requests or write requests) from a host computer, and comprise memory 40b, a control unit 40a, and a system disk drive portion 40c.

The memory 40b has a cache area, which serves as a so-called cache for a plurality of disks, holding a portion of the data held in the plurality of disks of the disk enclosures 2-0 to 2-15; a configuration definition storage area 470; and other work areas.

The control unit 40a controls the memory 40b, channel adapters 41, device adapters 42, and DMA 43, and has one or a plurality (here, two) of CPUs 400, 410, and a memory controller 420. The memory controller 420 controls memory reading and writing, and also performs path switching.

The memory controller 420 is connected via a memory bus 434 to the memory 40b, via the CPU bus 430, 432 to the CPUs 400, 410, and via four-lane high-speed serial buses (for example, PCI-Express) 440, 442 to the disk adapters 42a, 42b.

Similarly, the memory controller 420 is connected via four-lane high-speed serial buses (for example, PCI-Express) 443, 444, 445, 446 to the channel adapters 41 (here, four channel adapters 41a, 41b, 41c, 41d), and via four-lane high-speed serial buses (for example, PCI-Express) 447, 448 to the DMA units 43 (here, two DMA units 43-a, 43-b).

The PCI (Peripheral Component Interconnect)-Express or other high-speed serial buses perform packet communication, and by providing a plurality of lanes in the serial buses, the number of signal lines can be reduced with minimal delays and fast response, in so-called low-latency communication.

Further, the memory controller 420 is connected via the serial bus 436 to the system disk drive portion 40c. The system disk drive portion 40c has a bridge circuit 450, a fiber channel circuit 452, and a pair of system disk drives 453, 454.

The bridge circuit 450 connects the memory controller 420 to the fiber channel circuit 452 and to a service processor 44 provided on the outside of the control module 4-0. The service processor 44 comprises, for example, a personal computer, and is used for system state confirmation, diagnostics and maintenance.

The fiber channel circuit 452 is connected to at least two system disk drives 453, 454 (here, two Hard Disk Drives). Hence the CPUs 400, 410 and similar can directly access the system disk drives 453, 454 via the memory controller 420. Further, the service processor 44 also can access the system disk drives 453, 454, via the bridge circuit 450.

The two system disk drives 453, 454 mirror the log data and similar. That is, a copy of the data on one of the system disk drives 453 is stored in the other system disk drive 454. In other words, the system disk drives 453, 454 are built into the control module 4-0, and the CPUs 400, 410 can access the system disk drives 453, 454 without the intervention of the DAs 42a, 42b or BRT 5-0.

The channel adapters 41a to 41d are interfaces with host computers; the channel adapters 41a to 41d are each connected to a different host computer. It is preferable that the channel adapters 41a to 41d are each connected to the interface portions of the corresponding host computers via a bus, such as for example a fiber channel or Ethernet (a registered trademark) bus; in this case, an optical fiber or coaxial cable is used as the bus.

Further, the channel adapters 41a to 41d are each configured as a portion of the control modules 4-0 to 4-3. These channel adapters 41a to 41d support a plurality of protocols as the interfaces between the corresponding host computers and the control modules 4-0 to 4-3.

Because protocols to be mounted are not the same, depending on the host computers supported, the controllers 40 which are the principal units of the control modules 4-0 to 4-3 are mounted on separated print boards, so that the channel adapters 41a to 41d can be replaced easily as necessary.

For example, protocols with host computers to be supported by the channel adapters 41a to 41d include, as described above, fiber channel and iSCSI (Internet Small Computer System Interface) supporting Ethernet (a registered trademark).

Further, as explained above, each of the channel adapters 41a to 41d is directly connected to a controller 40 by a bus 443 to 446, such as a PCI-Express bus, designed for connection of LSI (Large Scale Integrated) devices and print boards. By this means, the high throughput required between the channel adapters 41a to 41d and the controllers 40 can be achieved.

The disk adapters 42a, 42b are interfaces with each of the disk drives in the disk enclosures 2-0 to 2-15, and are connected to the BRTs 5-0 to 5-3 connected to the disk enclosures 2-0 to 2-15; here, the disk adapters have four FC (Fiber Channel) ports.

As explained above, each of the disk adapters 42a, 42b is connected directly to a controller 40 by a bus, such as a PCI-Express bus, designed for connection to LSI (Large Scale Integrated) devices and print boards. By this means, the high throughput required between the disk adapters 42a, 42b and the controllers 40 can be achieved.

As shown in FIG. 1 and FIG. 3, the BRTs 5-0 to 5-3 are multi-port switches which selectively switch the disk adapters 42a, 42b of the control modules 4-0 to 4-3 and each of the disk enclosures 2-0 to 2-15 and make connections enabling communication.

As shown in FIG. 3, each of the disk enclosures 2-0 to 2-7 is connected to a plurality (here, two) of BRTs 5-0, 5-1. As shown in FIG. 4, a plurality (for example, 15) of disk drives 200, each having two ports, are installed in each of the disk enclosures 2-0 to 2-7. The disk enclosure 2-0 is configured with the necessary number of unit disk enclosures 20-0 to 23-0, each having four connection ports 210, 212, 214, 216, connected in series, to obtain increased capacity. Here, up to a maximum four unit disk enclosures 20-0 to 23-0 can be connected.

Within each of the unit disk enclosures 20-0 to 23-0, each port of each disk drive 200 is connected to two ports 210, 212 by means of a pair of FC (Fiber Channel) cables from the two ports 210, 212. As explained in FIG. 3, these two ports 210, 212 are connected to different BRTs 5-0, 5-1.

As shown in FIG. 1, each of the disk adapters 42a, 42b of the control modules 4-0 to 4-3 are connected to all the disk enclosures 2-0 to 2-15. That is, the disk adapters 42a of each of the control modules 4-0 to 4-3 are connected to BRT 5-0 (see FIG. 3) connected to the disk enclosures 2-0 to 2-7, BRT 5-0 connected to the disk enclosures 2-0 to 2-7, BRT 5-2 connected to the disk enclosures 2-8 to 2-15, and BRT 5-2 connected to the disk enclosures 2-8 to 2-15.

Similarly, the disk adapters 42b of each of the control modules 4-0 to 4-3 are connected to BRT 5-1 (see FIG. 3) connected to the disk enclosures 2-0 to 2-7, BRT 5-1 connected to the disk enclosures 270 to 2-7, BRT 5-3 connected to the disk enclosures 2-8 to 2-15, and BRT 5-3 connected to the disk enclosures 2-8 to 2-15.

In this way, each of the disk enclosures 2-0 to 2-15 is connected to a plurality (here, two) of BRTs, and different disk adapters 42a, 42b in the same control modules 4-0 to 4-3 are connected to the two BRTs connected to the same disk enclosures 2-0 to 2-15.

By means of such a configuration, each control module 4-0 to 4-3 can access all of the disk enclosures (disk drives) 2-0 to 2-15 via either of the disk adapters 42a, 42b, and via any path.

As shown in FIG. 2, each disk adapter 42a, 42b is connected to the corresponding BRT 5-0 to 5-3 by a bus, such as for example a fiber channel or Ethernet (a registered trademark) bus. In this case, as explained below, the bus is provided as electrical wiring on the print board of the back panel.

As explained above, one-to-one mesh connections are provided between the disk adapters 42a, 42b of each of the control modules 4-0 to 4-3 and the BRTs 5-0 to 5-3 to connect all the disk enclosures, so that as the number of control modules 4-0 to 4-3 (that is, the number of disk adapters 42a, 42b) increases, the number of connections increases and connections become complex, so that physical mounting becomes difficult. However, by adopting fiber channels, requiring few signals to construct an interface, as the connections between the disk adapters 42a, 42b and the BRTs 5-0 to 5-3, mounting on the print board becomes possible.

When each of the disk adapters 42a, 42b and corresponding BRTs 5-0 to 5-3 are connected by a fiber channel, the BRTs 5-0 to 5-3 are fiber channel switches. Further, the BRTs 5-0 to 5-3 and the corresponding disk enclosures 2-0 tot 2-15 are for example connected by fiber channels; in this case, because the modules are different, connection is by optical cables 500, 510.

As shown in FIG. 1, the DMA engines 43 communicate with each of the control modules 4-0 to 4-3, and handle communication and data transfer processing with the other control modules. Each of the DMA engines 43 of the control modules 4-0 to 4-3 is configured as a portion of the control modules 4-0 to 4-3, and is mounted on the board of the controller 40 which is a principal unit of the control modules 4-0 to 4-3. Each DMA engine is directly coupled to the controllers 40 by means of the high-speed serial bus described above, and also communicates with the DMA engines 43 of the other control modules 4-0 to 4-3 via the FRTs 6-0, 6-1.

The FRTs 6-0, 6-1 are connected to the DMA engines 43 of a plurality (in particular three or more; here, four) of control modules 4-0 to 4-3, selectively switch among these control modules 4-0 to 4-3, and make connections enabling communication.

By means of this configuration, each of the DMA engines 43 of the control modules 4-0 to 4-3 executes communication and data transfer processing (for example, mirroring processing) via the FRTs 6-0, 6-1 between the controller 40 to which it is connected and the controllers 40 of other control modules 4-0 to 4-3, according to access requests and similar from a host computer.

Further, as shown in FIG. 2, the DMA engines 43 of each control module 4-0 to 4-3 comprise a plurality (here, two) of DMA engines 43-a, 43-b; each of these two DMA engines 43-a, 43-b uses two FRTs 6-0, 6-1.

As indicated in FIG. 2, the DMA engines 43-a, 43-b are connected to the controller 40 by, for example, a PCI-Express bus. That is, in communication and data transfer (DMA) processing between the control modules 4-0 to 4-3 (that is, between the controllers 40 of the control modules 4-0 to 4-3), large amounts of data are transferred, and it is desirable that the time required for transfer be short, so that a high throughput as well as low latency (fast response time) are demanded. Hence as shown in FIG. 1 and FIG. 2, the DMA engines 43 and FRTs 6-0, 6-1 of the control modules 4-0 to 4-3 are designed so as to satisfy the demands for both high throughput and low latency, and are connected by a bus which utilizes high-speed serial transfer (PCI-Express or Rapid-IO).

The PCI-Express and Rapid-IO buses employ high-speed serial transfer at 2.5 Giga-bps and a small-amplitude differential interface called LVDS (Low Voltage Differential Signaling) is adopted as the bus interface.

Read/Write Processing

Figure 5:
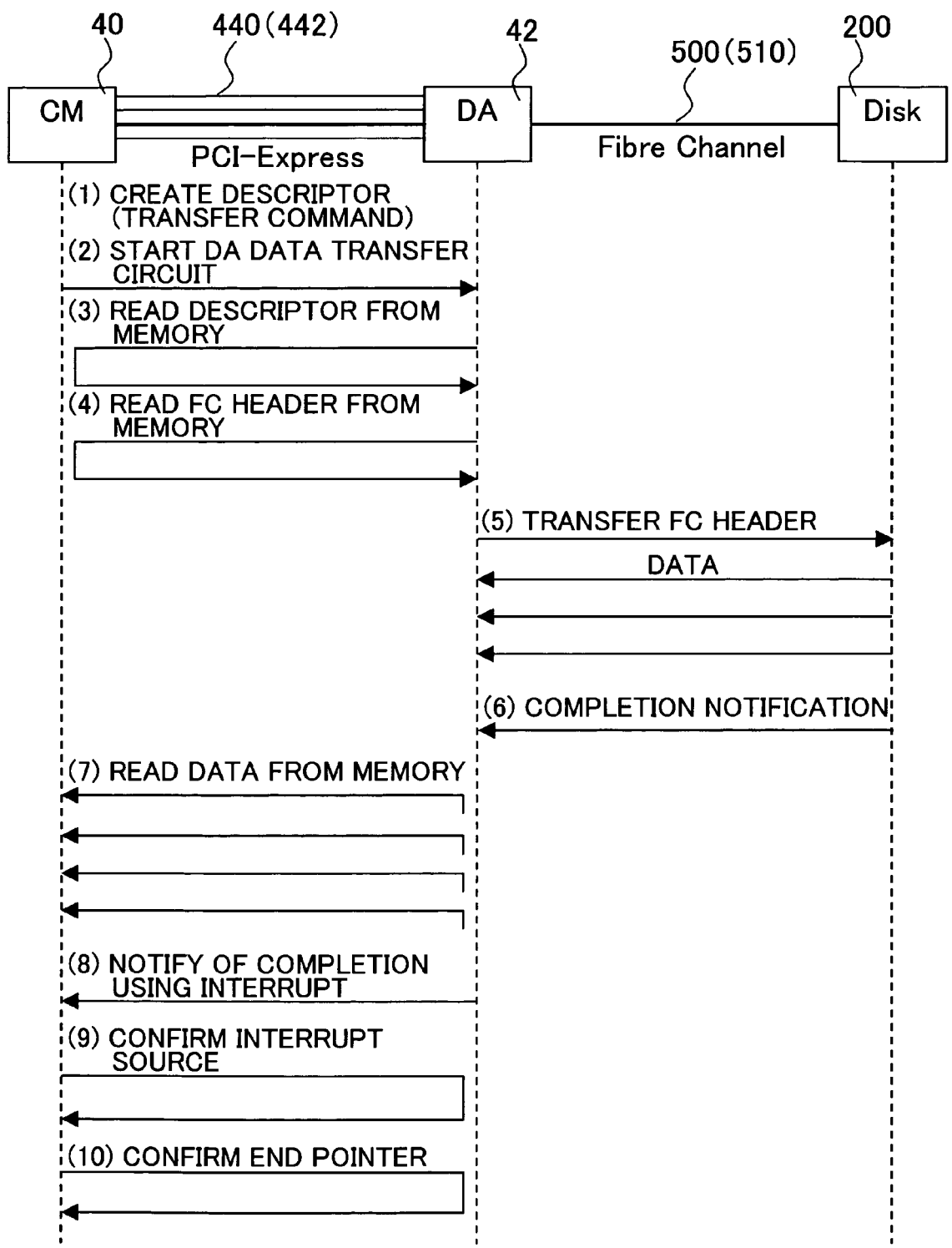
FIG. 5 explains read processing in the configuration of FIG. 1 and FIG. 2.

Next, read processing in the data storage system of FIG. 1 through FIG. 4 is explained. FIG. 5 explains read operation in the configuration of FIG. 1 and FIG. 2.

First, when a control unit (control manager) 40 receives a read request via a channel adapter 41*a* to 41*d* from one of the corresponding host computers, if the relevant data of the read request is held in the cache memory 40*b*, the relevant data held in the cache memory 40*b* is sent to the host computer via the channel adapter 41*a* to 41*d*.

If on the other hand the relevant data is not held in the cache memory 40*b*, the control manager (control unit) 40*a* first reads the relevant data from the disk drive 200 holding the relevant data into the cache area of memory 40*b*, and then transmits the relevant data to the host computer issuing the read request.

Processing to read the disk drive is explained in FIG. 5.

(1) The control unit 40*a* (CPU) of the control manager 40 creates a FC header and descriptor in the descriptor area of the cache memory 40*b*. A descriptor is a command requesting data transfer by a data transfer circuit, and contains the address in cache memory of the FC header, the address in cache memory of the data to be transferred, the number of data bytes, and the logical address of the disk for data transfer.

(2) The control unit 40*a* starts data transfer circuit of the disk adapter 42.

(3) The started data transfer circuit of the disk adapter 42 reads the descriptor from cache memory 40*b*.

(4) The started data transfer circuit of the disk adapter 42 reads the FC header from cache memory 40*b*.

(5) The started data transfer circuit of the disk adapter 42 decodes the descriptor and obtains the request disk, leading address, and number of bytes, and transfers the FC header to the relevant disk drive 200 using the fiber channel 500 (510). The disk drive 200 reads the requested data, and transmits the data over the fiber channel 500 (510) to the data transfer circuit of the disk adapter 42.

(6) Upon having read and transmitted the requested data, the disk drive 200 transmits a completion notification over the fiber channel 500 (510) to the data transfer circuit of the disk adapter 42.

(7) Upon receiving the completion notification, the data transfer circuit of the disk adapter 42 reads the read data from the memory of the disk adapter 42 and stores the data in the cache area of memory 40*b*.

(8) When read transfer is completed, the started data transfer circuit of the disk adapter 42 uses an interrupt to send completion notification to the control manager 40.

(9) The control unit 40*a* of the control manager 40 obtains the interrupt source of the disk adapter 42 and confirms the read transfer.

(10) The control unit 40*a* of the control manager 40 checks the end pointer of the disk adapter 42 and confirms the completion of read transfer.

Thus in order to obtain sufficient performance, high throughput must be maintained over all connections, but many signals (in the drawing, seven) are exchanged between the control portion 40*a* and disk adapter 42, and a low-latency bus is especially important. In this embodiment, both the PCI-Express (four-lane) bus and the Fiber Channel (4G) bus are adopted as connections having high throughput; but whereas PCI-Express is a low-latency connection, Fiber Channel is a comparatively high latency (time is required for data transfer) connection.

In this embodiment, fiber channel can be adopted in the BRTs 5-0 to 5-3 for the configuration of FIG. 1. In order to achieve low latency, although the number of bus signals cannot be decreased beyond a certain number, in this embodiment fiber channel with a small number of signal lines can be used for the connection between disk adapters 42 and BRTs 5-0; the number of signals on the back panel is reduced, providing advantages for mounting.

Next, write operation is explained. When a write request is received from one of the host computers via the corresponding channel adapter 41*a* to 41*d*, the channel adapter 41*a* to 41*d* which has received the write request command and write data queries the control manager 40 for the address in the cache area of memory 40*b* to which to write the write data.

When the channel adapter 41*a* to 41*d* receives the response from the control manager 40, the channel adapter 41*a* to 41*d* writes write data to the cache area of memory 40*b* of the control manager 40, and in addition writes the write data to the cache area in the memory 40*b* in at least one control manager 40 different from the control manager 40 in question (that is, the control manager 40 of a different control module 4-0 to 4-3). For this purpose the DMA engine 43 is started, and the write data is also written to the cache area of memory 40*b* in the control manager 40 of another control module 4-0 to 4-3, via an FRT 6-0, 6-1.

Here, by means of redundant writing (mirroring) of the data, even in the event of an unforeseen hardware failure of a control module 4-0 to 4-3 or control manager 40, data loss can be prevented. Finally, when writing of cache data to the cache areas of the plurality of memory units 40*b* ends normally, the channel adapter 41*a* to 41*d* sends notification of completion to the host computer, and processing ends.

The write data must then be written back (write-back) to the relevant disk drive. The control unit 40*a* writes back the write data in the cache area of memory 40*b* to the disk drive 200 holding the relevant data, according to an internal schedule. The write processing to this disk drive are explained using FIG. 6.

(1) The control unit 40*a* (CPU) of the control manager 40 creates an FC header and descriptor in the descriptor area of memory 40*b*. The descriptor is a command requesting data transfer by a data transfer circuit, and contains the address in cache memory of the FC header, the address in cache memory of the data to be transferred, the number of data bytes, and the logical address of the disk for data transfer.

(2) The control unit 40*a* starts data transfer circuit of the disk adapter 42.

(3) The started data transfer circuit of the disk adapter 42 reads the descriptor from the memory 40*b*.

(4) The started data transfer circuit of the disk adapter 42 reads the FC header from the memory 40*b*.

(5) The started data transfer circuit of the disk adapter 42 decodes the descriptor and obtains the request disk, leading address, and number of bytes, and reads the data from the cache area of the memory 40*b*.

(6) After the completion of reading, the data transfer circuit of the disk adapter 42 transfers the FC header and read data to the relevant disk drive 200 via fiber channel 500 (510). The disk drive 200 writes the transferred data to an internal disk.

(7) Upon completion of data writing, the disk drive 200 sends notification of completion to the data transfer circuit of the disk adapter 42 via the fiber channel 500 (510).

(8) Upon receiving notification of completion, the started data transfer circuit of the disk adapter 42 uses an interrupt to send completion notification to the control manager 40.

(9) The control unit 40$a$ of the control manager 40 obtains the interrupt source of the disk adapter 42 and confirms the write operation.

(10) The control unit 40$a$ of the control manager 40 checks the end pointer of the disk adapter 42 and confirms the completion of the write operation.

Figure 6:
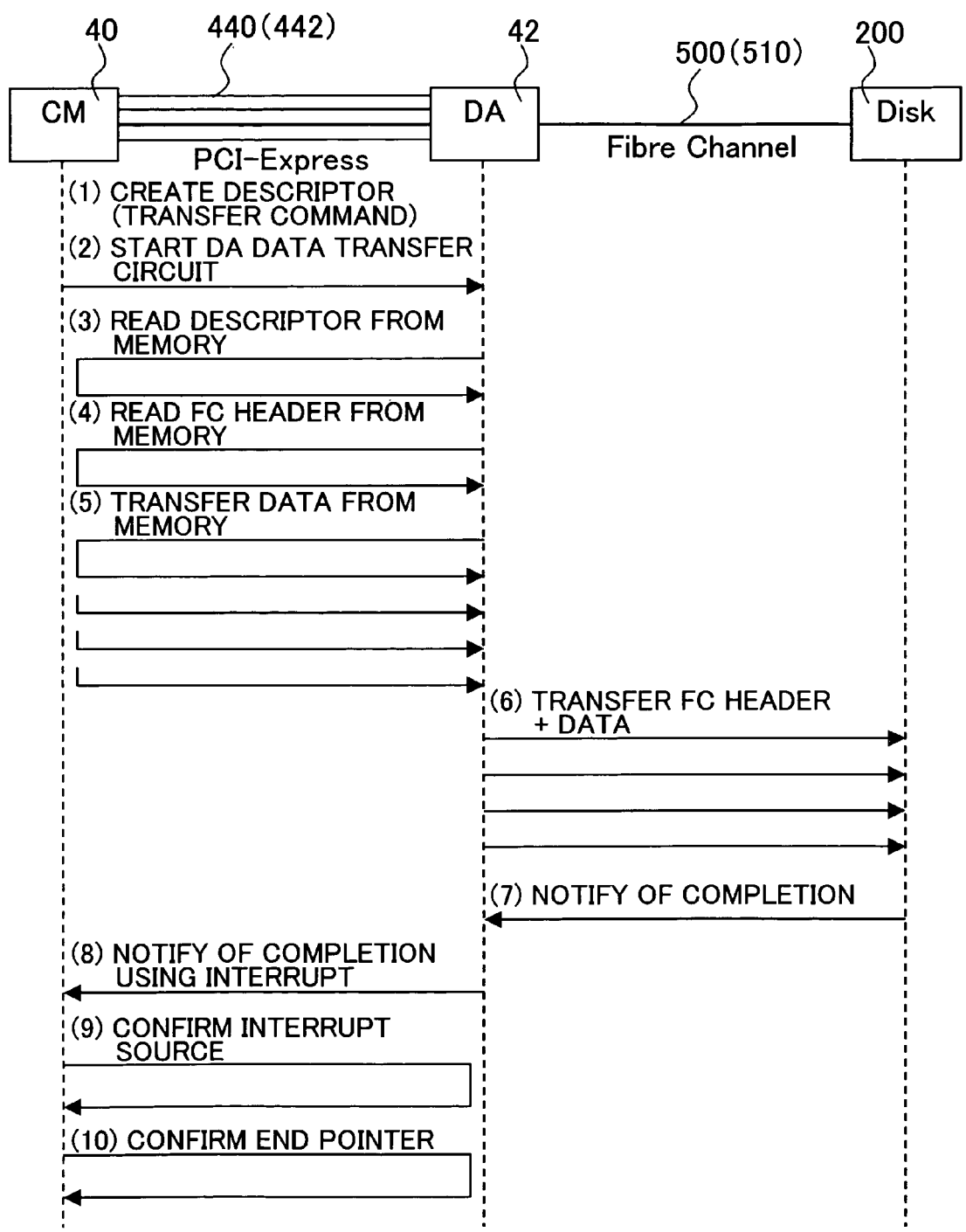
FIG. 6 explains write processing in the configuration of FIG. 1 and FIG. 2.

In both FIG. 5 and FIG. 6, arrows indicate the transfer of packets such as data, and U-shaped arrows represent data reading, indicating that data is sent back in response to a data request. Because starting of the control circuit in the DA and confirmation of the end state are necessary, seven exchanges of signals are necessary between the CM 40 and DA 42 in order to perform a single data transfer. Between the DA 42 and disk 200, two signal exchanges are required.

Thus it is clear that low latency is required for the connection between the cache control portion 40 and the disk adapter 42, whereas an interface with fewer signals can be used between the disk adapter 42 and disk device 200.

Next, read/write access of the above-described system disk drives 453, 454 is explained. Read/write access from the CM (CPU) 40$a$ is similar to that in FIG. 5 and FIG. 6, with DMA transfer performed between memory 40$b$ and the system disk drives 453, 454. That is, a DMA circuit is provided in the fiber channel circuit 452 of FIG. 2, and the CPU 400 (410) prepares a descriptor and starts the DMA circuit of the fiber channel circuit 452.

For example, reading of firmware, log data, and backup data (including data saved from the cache area) on the system disk drive is similar to that of FIG. 5; the CPU 400 (410) creates an FC header and descriptor, and by starting the DMA circuit (read operation) of the fiber channel circuit 452, the firmware, log data, and backup data are transferred by DMA from the system disk drive 453, 454 to the memory 40$b$.

Similarly, writing of log data and backup data is similar to that in FIG. 6; the CPU 400 (410) creates an FC header and descriptor, and by starting the DMA circuit (write operation) of the fiber channel circuit 452, log data and backup data are transferred by DMA to the system disk drive 453, 454 from the memory 40$b$. This log data writing is executed periodically, or when a fixed amount of log data is accumulated in memory 40$b$, or when power is turned off.

By thus incorporating system disks into controllers, even when problems arise in a path between controllers and the BRTs and disk enclosures, if the controller and other paths are normal, firmware and apparatus configuration backup data can be read by the controller from the system disk, and operations employing other paths are possible. Moreover, a controller can read and write log data to and from a system disk, so that analysis upon occurrence of a fault and diagnostics for fault prevention are possible.

Further, when in the event of a power outage the power is switched to batteries and the data in cache memory is backed up to a system disk, there is no need to supply power to a disk enclosure, so that the battery capacity can be made small. And, because there is no need to write backup data to a system disk via a disk adapter or cable, the write time can be shortened, so that the battery capacity can be made small even for a large write memory capacity.

Further, because a pair of system disk drive is provided in a redundant configuration, even if a fault were to occur in one of the system disk drives, backup using the other system disk drive would be possible. That is, a RAID-1 configuration can be adopted.

The service processor 44 of FIG. 2 can also access the system disk drives 453, 454 via the bridge circuit 450. Firmware and apparatus configuration data are downloaded from the service processor 44 to the system disk drives 453, 454.

Mounted Configuration

Figure 7:
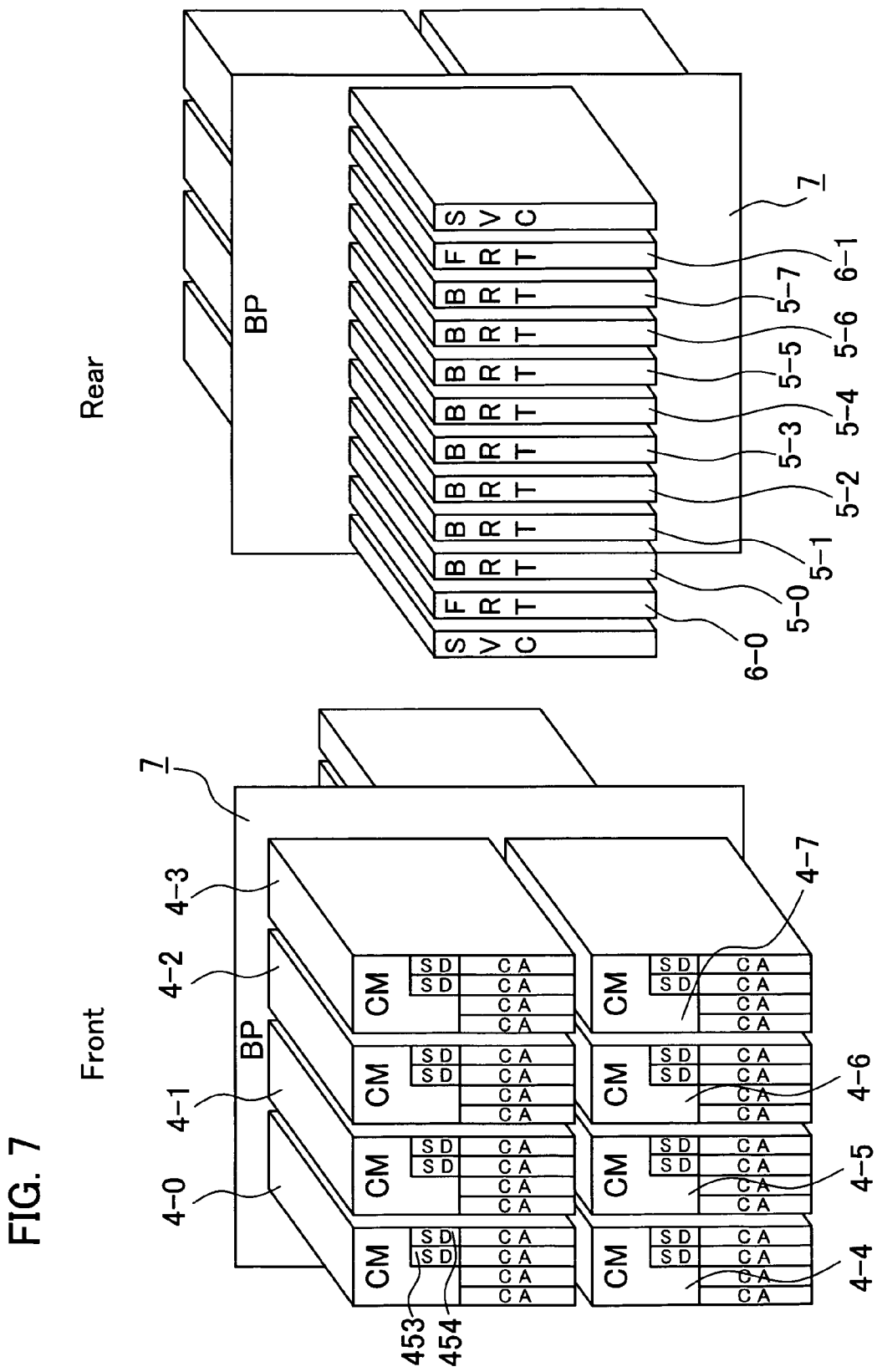
FIG. 7 shows the mounted configuration of a control module in one embodiment of the invention.
Figure 8:
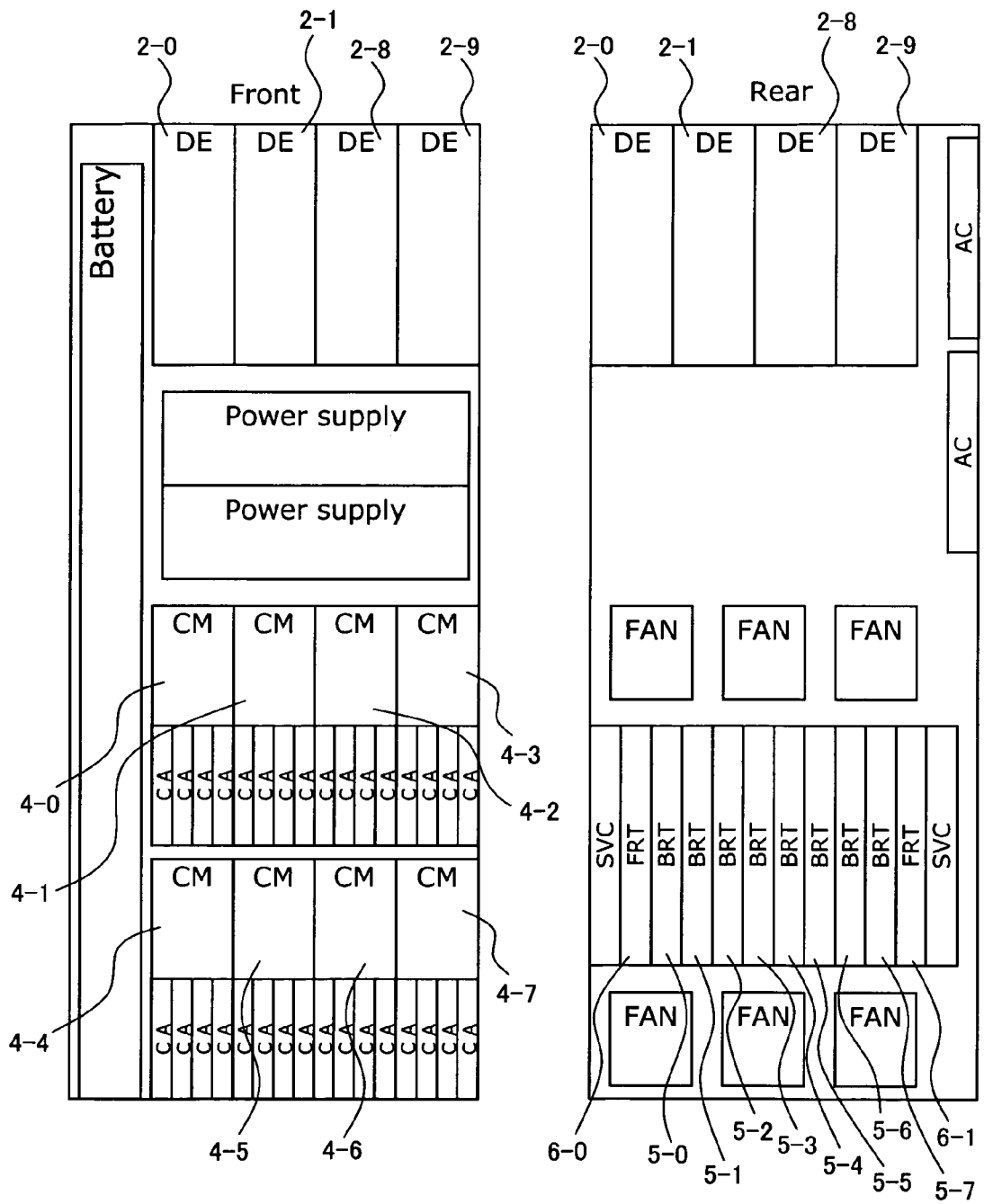
FIG. 8 shows an example of the mounted configuration of a data storage system in one embodiment of the invention.

FIG. 7 shows an example of the mounted configuration of control modules of this invention, and FIG. 8 shows a mounted configuration example, including disk enclosures and the control modules of FIG. 7.

As shown in FIG. 8, on the upper side of the storage apparatus housing are installed four disk enclosures 2-0, 2-1, 2-8, 2-9. Control circuits are installed in the lower half of the storage apparatus. As shown in FIG. 7, the lower half is divided into front and back by a back panel 7. Slots are provided in the front side and in the back side of the back panel 7. This is an example of the mounted structure of a storage system with eight CMs installed, larger in scale than the four CMs 4-0 to 4-3 of FIG. 1; but except for the different number of CMs, the configuration is the same.

That is, as shown in FIG. 7, eight CMs 4-0 to 4-7 are positioned on the front side, and two FRTs 6-0, 6-1, eight BRTs 5-0 to 5-7, and a service processor SVC (symbol "44" in FIG. 2) in charge of power supply control and similar, are positioned on the back side.

Two system disk drives 453, 454 are provided in each of the CMs 4-0 to 4-7. In FIG. 7, the symbols "453" and "454" are assigned to the system disk drives (SDs) of CM 4-0; the configuration is similar for the other CMs 4-1 to 4-7, but these are omitted in FIG. 7 in order to avoid complicating the drawing. These system disk drives 453, 454 can be inserted and removed from the back panel 7.

In FIG. 7, the eight CMs 4-0 to 4-7 and two FRTs 6-0, 6-1 are connected, via the back panel 7, to a four-lane PCI-Express bus. The PCI-Express has four signal lines (for differential, bidirectional communication) in a lane, so that there are 16 signal lines in four lanes, and the total number of signal lines is 16×16=256. The eight CMs 4-0 to 4-7 and eight BRTs 5-0 to 5-7 are connected via the back panel 7 to fiber channel. For differential, bidirectional communication, the fiber channel has 1×2×2=4 signal lines, and there are 8×8×4=256 such signal lines.

Thus by selectively utilizing buses at different connection points, even in a large-scale storage system, connections between eight CMs 4-0 to 4-7, two FRTs 6-0 and 6-1, and eight BRTs 5-0 to 5-7 can be achieved using 512 signal lines. This number of signal lines can be mounted without problem on a back panel board 7, and six signal layers on the board are sufficient, so that in terms of cost this configuration is fully realizable.

In FIG. 8, four disk enclosures, 2-0, 2-1, 2-8, 2-9 are installed; the other disk enclosures, 2-3 to 2-7 and 2-10 to 2-15, are provided in separate housings.

Because one-to-one mesh connections are provided between the disk adapters 42$a$, 42$b$ of each of the control modules 4-0 to 4-7 and the BRTs 5-0 to 5-7, even if the number of control modules 4-0 to 4-7 comprised by the system (that is, the number of disk adapters 42$a$, 42$b$) is increased, fiber channel with a small number of signal lines comprised by the interface can be employed for connection of the disk adapters 42$a$, 42$b$ to the BRTs 5-0 to 5-7, so that problems arising from mounting can be resolved.

Thus if, for example, system disk drives of size approximately 2.5 inches are used, mounting (incorporation) in CM 4-0 and similar is easily accomplished, and so no problems are posed by mounting.

First Embodiment of Log Data Equalization Processing

Figure 25:
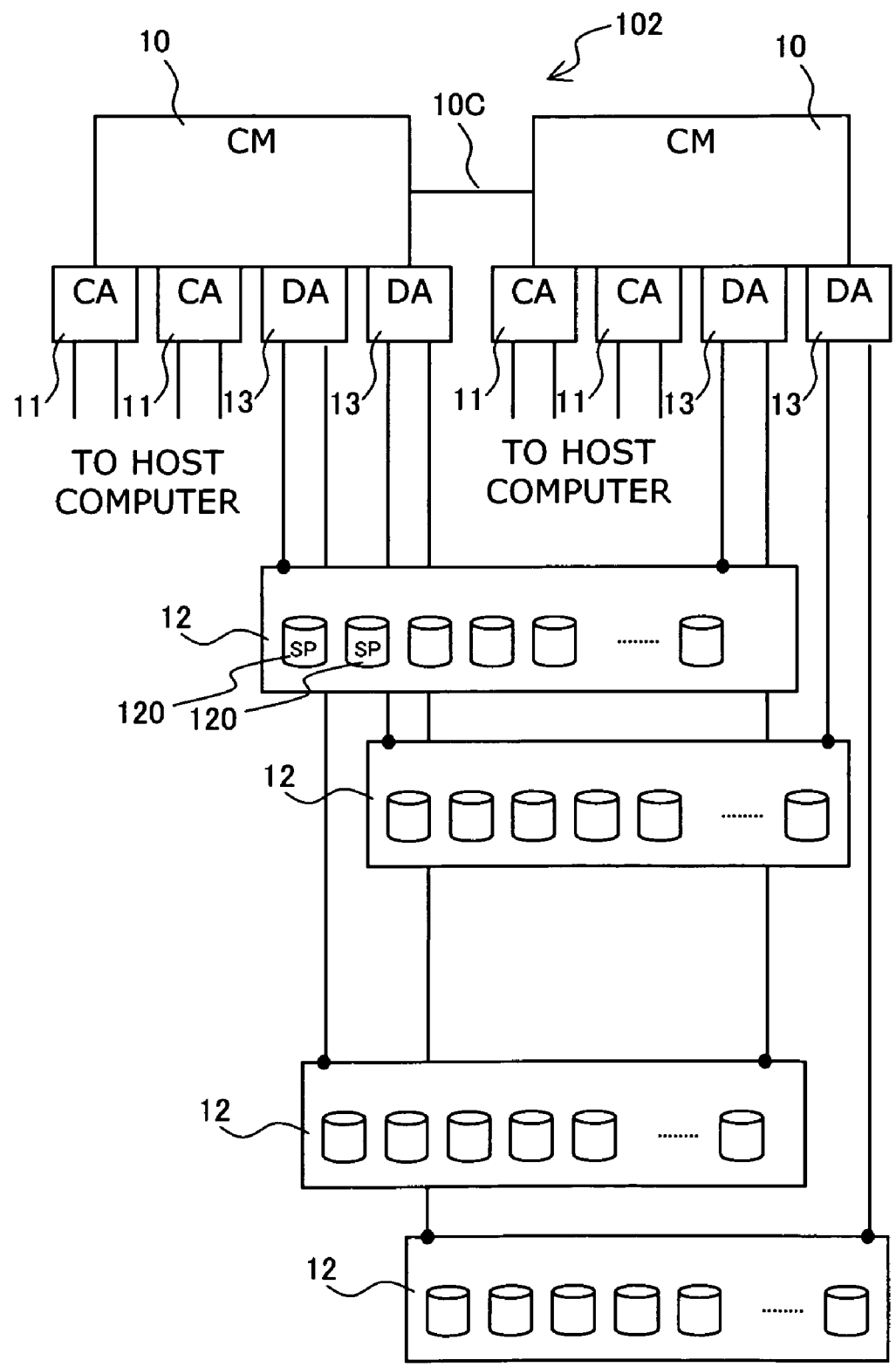

As shown in FIG. 2, by installing the system disk drives 453, 454 in the CM 4-0 and similar, the above-described advantages accrue, but problems arise which are different from those of an apparatus with system disk drives installed in disk enclosures, such as in the configuration of the prior art in FIG. 25.

Log data, comprising log data for tasks and threads in progress in each of the CMs 4-0 to 4-3, is stored in the system disk drives 453, 454 for the CM. In the conventional configuration of FIG. 25, even if a malfunction occurs in one CM in the system, the other CMs can access the system disk drives of the malfunctioning CM, and log data output is possible.

But as shown in FIG. 2, when the system disk drives 453, 454 are installed in CM 4-0, if there is a malfunction due to some problem with the CM 4-0, there are cases in which the system disk drives 453, 454 of the CM 4-0 cannot be accessed; in such cases, log data output is not possible.

Below, a log data equalization control method for avoiding states in which log data output is not possible upon a CM abnormality is explained. This processing method is a method of storing log data for all CMs in the system disks of all mounted CMs, and does not merely entail operation to store log data for tasks and threads for each CM on a system disk of the CM.

In this method, equalization processing of log data is performed for the system disks of all CMs, so that even when anomalies occur in a plurality of CMs, and there is only a single normally operating CM, log data is not lost and can be output.

Below, an example of writing from CM 4-0 to the CMs 4-1 to 4-3 is explained using FIG. 9 through FIG. 12; writing from CM 4-1 through CM 4-3 to other CMs is similar.

Figure 9:
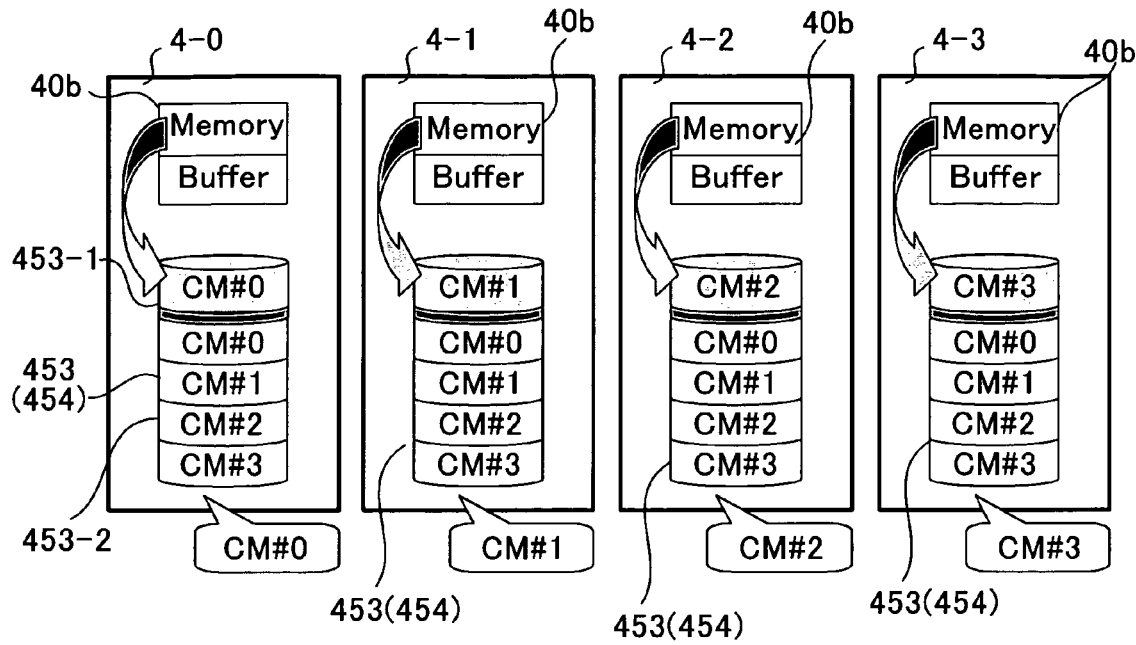
FIG. 9 explains the operation of log data collection in the log data equalization method of a first embodiment of the invention.

(1) As shown in FIG. 9, each of the CMs 4-0 to 4-3 writes log data CM #0 written to the memory 40*b* of the CMs 4-0 to 4-3 to its own log data area 453-1 of the system disk drive 453 (454) mounted in the CM of itself. This log data writing is executed upon detection that log data in a prescribed amount (for example, 5 Mbytes) has been written to the memory 40*b*, or may be executed periodically using a timer. In this example, the log data storage area in the system disk drive 453 (454) is divided into a self-log data area 453-1 for writing the CM's own log data, and a log data storage area 453-2 for equalization.

Figure 10:
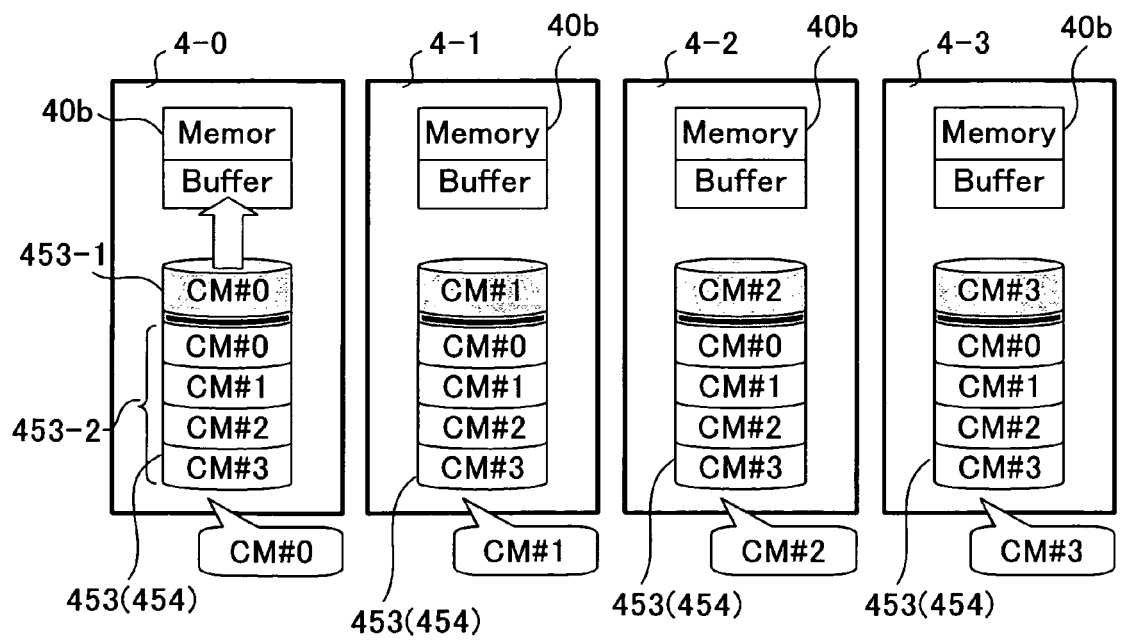
FIG. 10 explains log data read processing in the log data equalization method of the first embodiment of the invention.

(2) Equalization processing for the CM 4-0 is initiated, and as shown in FIG. 10, the log data CM #0 of log data area 453-1 in the system disk drive 453 (454), written in the processing of (1) above, is expanded (read) to the buffer area of the memory 40*b* of the CM 4-0.

Figure 11:
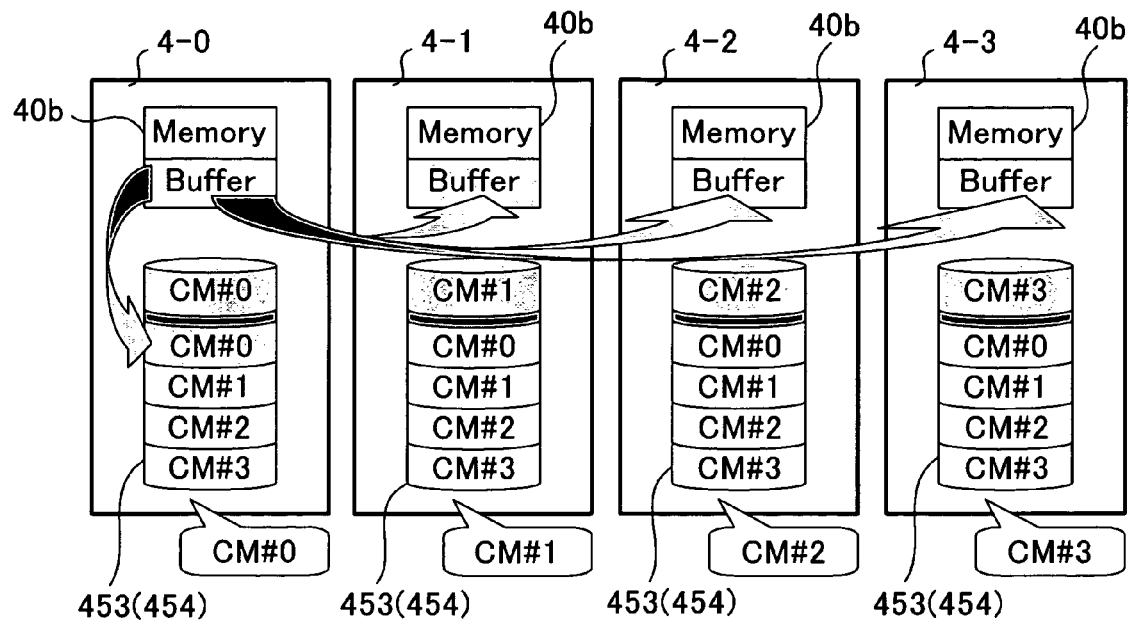
FIG. 11 explains log data distribution processing in the log data equalization method of the first embodiment of the invention.

(3) As shown in FIG. 11, the CM 4-0 writes the log data CM #0 expanded into the buffer area of memory 40*b* to the log data area 453-2 for equalization on its own system disk drive 453 (454). At the same time, the CM 4-0 transfers the log data CM #0 to the buffer areas of the memory 40*b* in the CMs 4-1 to 4-3. This transfer is performed from the DMA 43 in FIG. 1 and FIG. 2 via the front-end router 6-0 (6-1).

Figure 12:
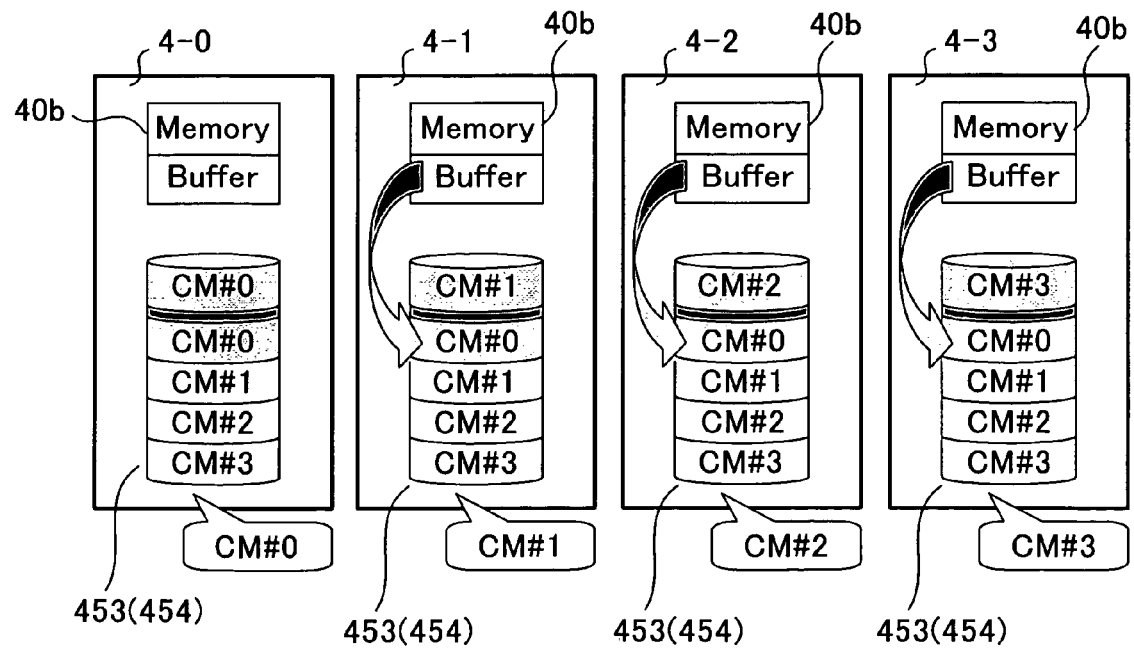
FIG. 12 explains log data equalization processing in the log data equalization method of the first embodiment of the invention.

(4) As shown in FIG. 12, the CM 4-1 writes the log data CM #0 transferred to the buffer area of memory 40*b* to the log data area 453-1 for equalization on the system disk drive 453 (454) installed in the CM 4-1. Similarly, the other CMs 4-2 and 4-3 also write the log data CM #0 transferred to the buffer area of memory 40*b* to the log data area 453-1 for equalization on the system disk drive 453 (454) installed in the CM 4-2 and 4-3.

When writing of log data CM #0 from the CM 4-1 to the system disk drives 453 (454) of all CMs is completed, equalization processing for the next CM 4-1 is initiated. And when log data transfer and write processing ends for all CMs, equalization processing is completed.

Thus log data is transferred among a plurality of CMs and each CM shares the log data for all CMs, so that although system disk drives are provided within CMs, even if anomalies occur in one or a plurality of CMs, log data for the anomalous CMs can be output from a remaining normal CM, and diagnostics and preventive maintenance of anomalous CMs is possible.

Further, a log data area 453-2 for equalization is provided and equalization log data is stored, so that upon output, it is sufficient to read this area, and output processing is easy and reliable. Similarly, the log data storage area 453-1 for each CM itself can also be used as the log data storage area 453-2 for equalization. By this means, the capacity of log data storage areas on a system disk can be kept small.

Figure 13:
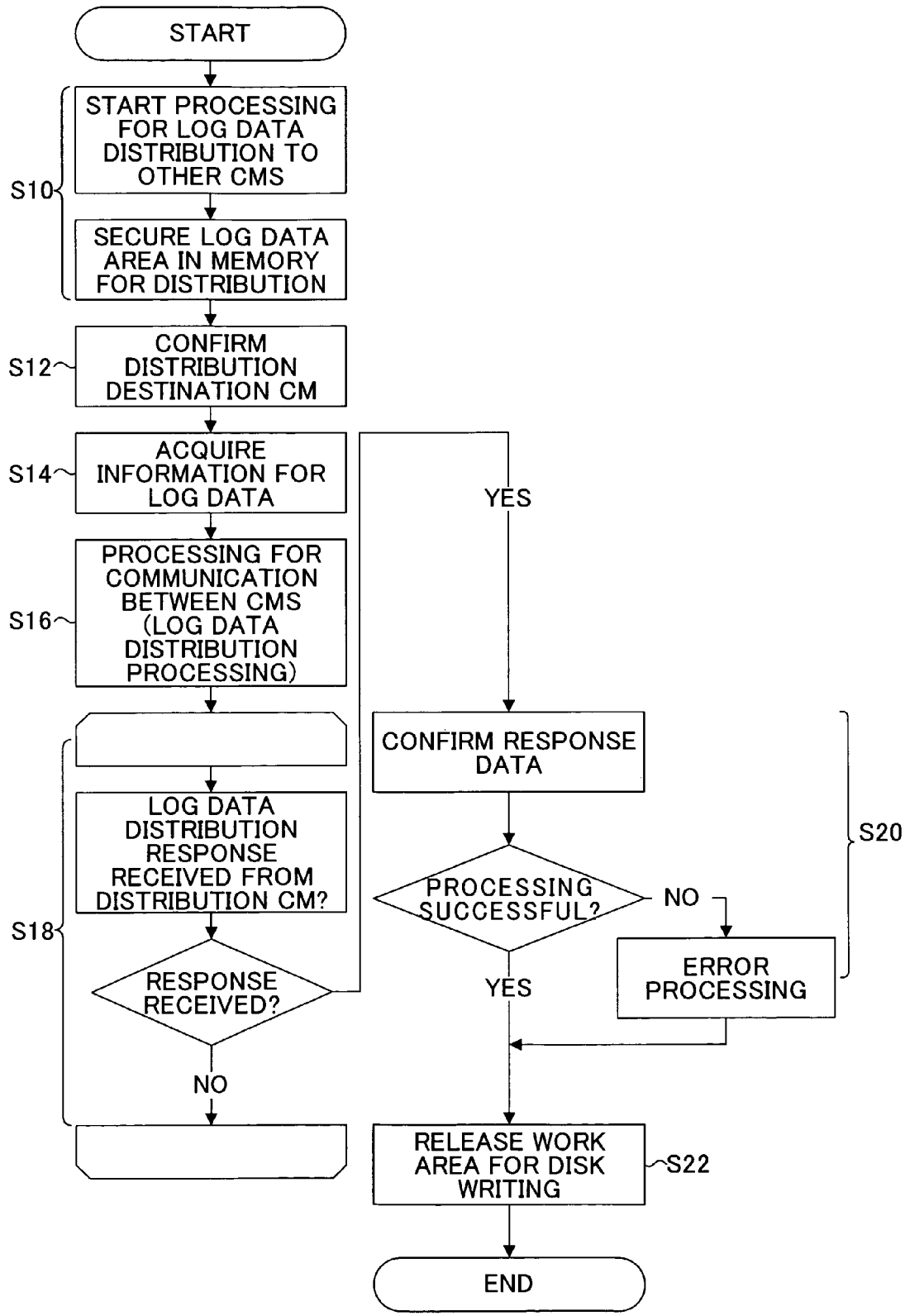
FIG. 13 shows the flow of log data distribution processing in the log data equalization method of the first embodiment of the invention.
Figure 14:
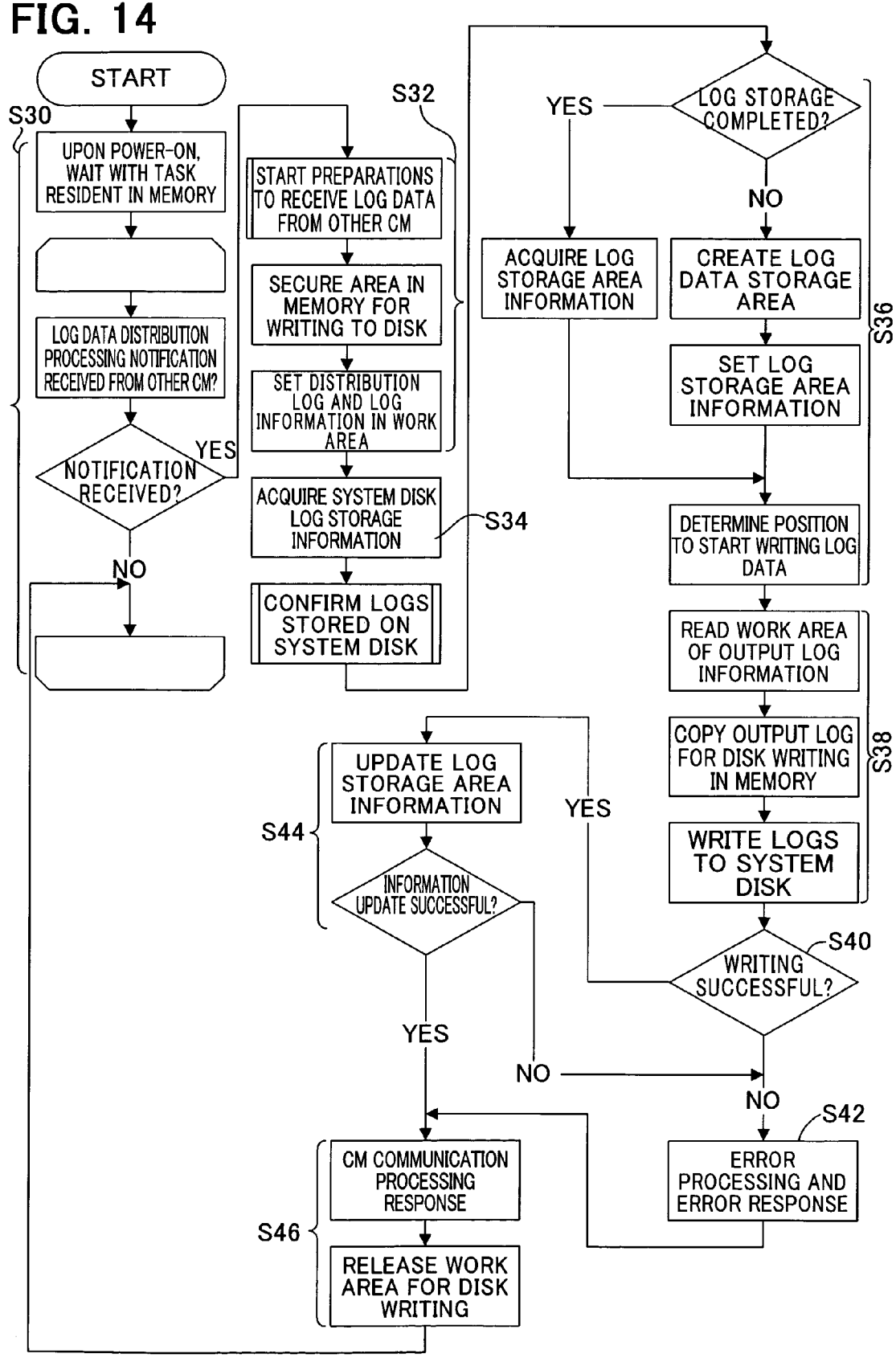
FIG. 14 shows the flow of log data storage processing in the log data equalization method of the first embodiment of the invention.

Next, log data equalization control processing is explained using FIG. 13 and FIG. 14. FIG. 13 shows the flow of log data equalization processing for the distribution source of log data, and FIG. 14 shows the flow of log data equalization processing for the distribution destination of log data. First, FIG. 13 is used to explain processing for the distribution source.

(S10) Processing for log data distribution to another (other) CM is initiated, and the control unit 40*a* (CPU 400 in FIG. 2) of the distribution source CM gets a work area (buffer area) in the memory 40*b*.

(S12) The control unit 40*a* (CPU 400) of the CM references the configuration information definition table T in memory 40*b* and confirms the distribution destination CMs. In FIG. 11, the distribution destination CMs are the CMs 4-0 to 4-3.

(S14) As shown in FIG. 10, the control unit 40*a* of the distribution source CM 4-0 expands (reads) the log data on the system disk drive 453 (454) written in the processing of FIG. 9 to the buffer area 453-1 of the memory 40*b*. This reading is only of the log data written in FIG. 9, and to this end, the storage address and data size of the log data in the buffer area 453-1 are acquired.

(S16) The control unit 40*a* provides the DMA 43 with the storage address and data size for the log data in the memory 40*b* as well as the distribution destination CM, as transfer information, and issues an instruction to begin transfer. By this means, as shown in FIG. 11, the CM 4-0 writes the log data CM #0 expanded into the buffer area of memory 40*b* to the log data area for equalization 453-2 in its own system disk drive 453 (454), via a front-end router 6-0 (6-1). This is repeated in step S12 for all distribution destination CMs.

(S18) The control unit 40*a* judges whether a log data distribution response (log data storage response) has been received from each of the distribution destination CMs. That is, communication responses from the distribution destination CMs are awaited.

(S20) Upon receiving responses, the control unit 40*a* confirms the response data. The control unit 40*a* judges whether response data indicates processing success; if processing is not successful, error processing is performed. For example, resending is performed, and if processing is not successful even after resending, an abnormality notification is sent. If processing is successful, or if error processing is performed, the work area (buffer area) secured in step S10 is released, and processing ends.

Next, log data equalization processing for distribution destination CMs is explained using FIG. 14.

(S30) When power is turned on, the control unit 40*a* of the distribution destination CM starts the processing task in the memory, and waits. That is, the control unit 40*a* monitors the arrival from a front-end router 6-0 (6-1) of log data distribution processing notification from the distribution source CM.

(S32) Upon receiving notification, the control unit 40*a* initiates preparation for log data reception. That is, the control unit 40*a* gets a work area (buffer area) in the memory 40*b*. In this case, a storage area for distributed log data and an area for log information (size, distribution source, and similar) are set in the work area.

(S34) Next, the control unit 40*a* acquires information for the log storage area (information indicating whether a log area is set) of the system disk drive 453 (454).

(S36) The control unit 40*a* then confirms the storage log area of the system disk drive 453 (454) from this information. That is, the control unit 40*a* checks whether log data for equalization is stored (an area for equalization is secured) in the system disk drive 453 (454). If log data is stored, the storage information (beginning address, size, and similar) for the equalization log data of the system disk drive 453 (454) is acquired. If log data is not stored, storage information (beginning address, size, and similar) for log data stored in the system disk drive 453 (454) is set, in order to secure an equalization log data storage area in the system disk drive 453 (454). By this means, the beginning position for writing of log data is determined.

(S38) Upon completing these setting preparations, the control portion 40*a* reads the log data CM #0 transferred from the distribution source CM to the buffer area in the memory 40*b*, as indicated in FIG. 11 and FIG. 12, and then uses the log information in the work area set in step S32 to copy log data in the work area from the specified address, in the log size amount, and writes the log data in question to the system disk drive 453 (454) from the beginning position for writing.

(S40) The control unit 40*a* judges whether writing has been successful (whether there has been notification from the system disk drive).

(S42) Upon judging that writing has not been successful, the control unit 40*a* performs error processing and creates an error response.

(S44) If on the other hand the control unit 40*a* judges that writing has been successful, the equalization log data storage information (for example, the storage position, time, and similar) stored in the system disk drive 453 (454) is updated for the portion of data written. The control unit 40*a* then judges whether the updating has been successful, and upon judging that updating has not been successful, returns to step S42, performs error processing, and creates an error response.

(S46) If in step S44 updating is judged to be successful, or if in step S42 an error response has been created, the control unit 40*a* returns the communication processing result to the distribution source CM. The control unit 40*a* then releases the work area (buffer area) in the memory 40*b*, returns to step S30, and awaits the next distribution processing notification.

Thus when log data equalization processing is performed, each CM secures and then releases a buffer area, and so makes dedicated use of memory 40*b* only during execution of equalization processing. Hence processing can be performed without any particular need to increase the capacity of memory 40*b*.

Second Embodiment of Log Data Equalization Processing

Next, a second embodiment of log data equalization processing is explained. In this control method, the log data of the CM in question, and the log data of one CM to which the next CM number is allocated, are stored in the system disk drive. Compared with the above-described method of sharing the log data of all CMs of the first embodiment, during normal operation of the apparatus a CM only manages its own log data and the log data of one other CM, so that the burden of communication processing between apparatuses is alleviated.

Figures 15, 16:
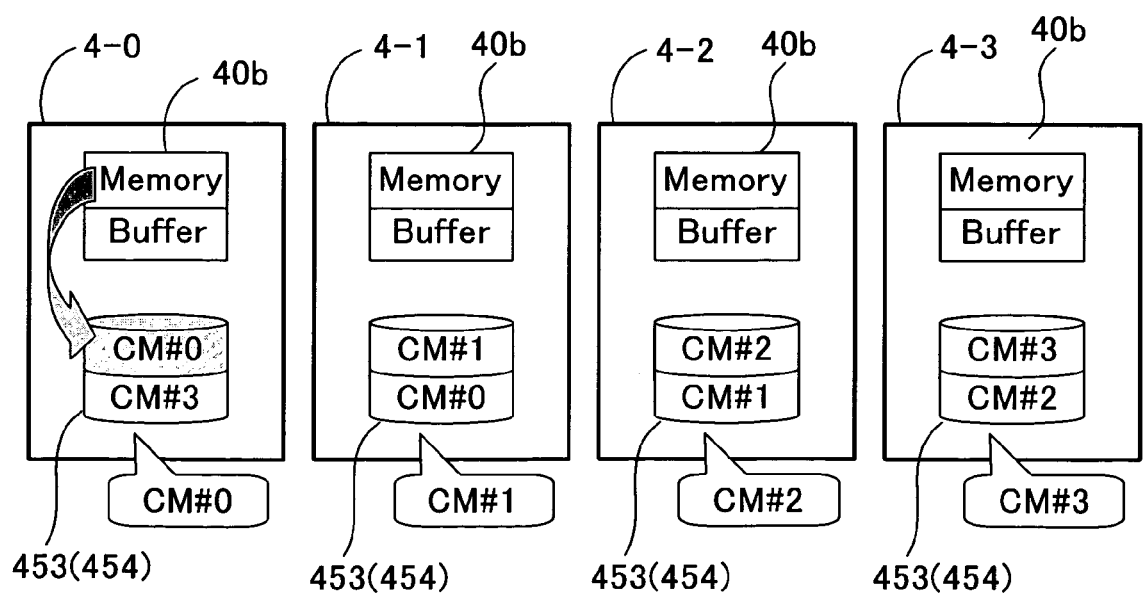
FIG. 15 explains the configuration information definition table of a second embodiment of the invention.
FIG. 16 explains log data collection operation in the log data equalization method of the second embodiment of the invention.

FIG. 15 explains the CM backup table of the configuration information definition table 470 of FIG. 2, and FIG. 16 through FIG. 19 explain log data equalization processing in other embodiments of the invention. Here too, an example is explained in which log data writing occurs in the CM 4-0, and log data is distributed to another CM; similar processing occurs when there is writing of log data in other CMs.

(1) As shown in FIG. 16, each of the CMs 4-0 to 4-3 writes the log data CM #0 written to the memory 40*b* of the CMs 4-0 to 4-3 to the log data area of its own system disk drive 453 (454). This log data writing is executed upon detection that log data in a prescribed amount (for example, 5 Mbytes) has been written to the memory 40*b*, or may be executed periodically using a timer.

Figure 17:
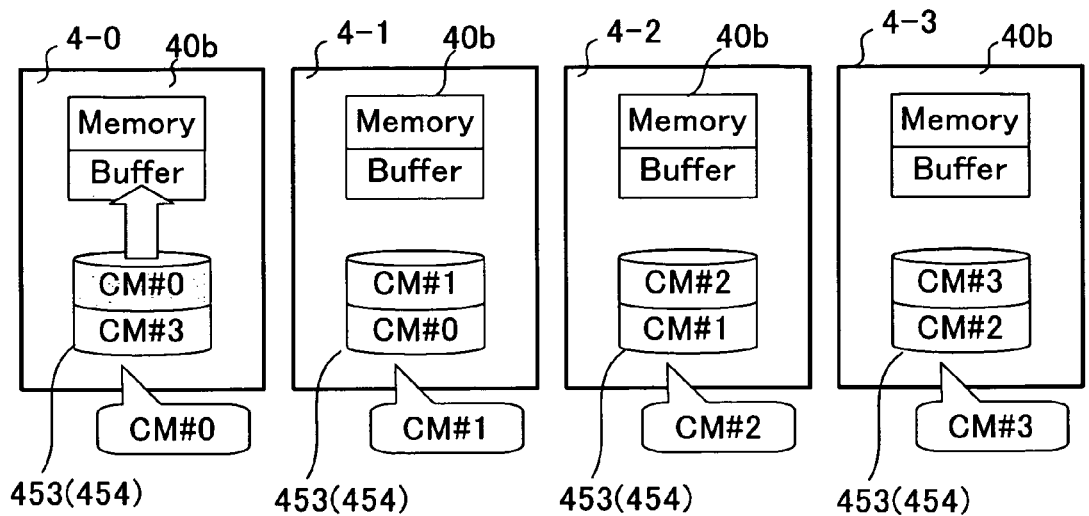
FIG. 17 explains log data read processing in the log data equalization method of the second embodiment of the invention.

(2) Equalization processing for the CM 4-0 is initiated, and as shown in FIG. 17, the log data CM #0 of the log data area in the system disk drive 453 (454), written in the processing of (1) above, is expanded (read) to the buffer area of the memory 40*b* of the CM 4-0.

Figure 18:
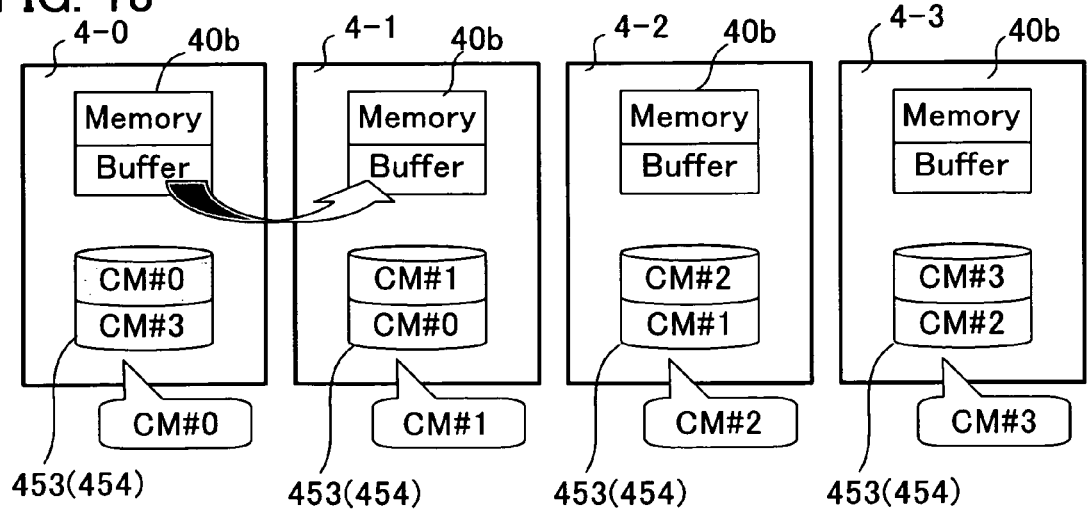
FIG. 18 explains log data distribution operation in the log data equalization method of the second embodiment of the invention.

(3) As shown in FIG. 18, the CM 4-0 transfers the log data CM #0 to the buffer area of memory 40*b* of the CM 4-1, to which the next CM number is allocated. This transfer is performed from the DMA 43 of FIG. 1 and FIG. 2 via a front-end router 6-0 (6-1). As shown in FIG. 15, the backup table 470-1 of the configuration information definition table 470 stores the backup CM numbers of each of the CMs 4-0 to 4-3. Normally the backup CM is the CM with the number following the CM's own number; for example, the backup CM for CM 4-0 is CM 4-1.

Figure 19:
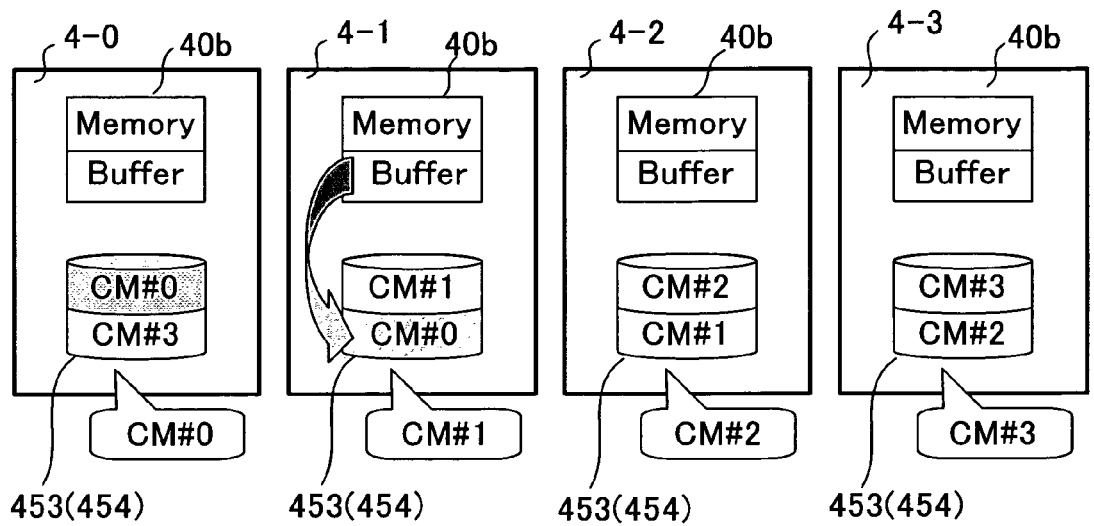
FIG. 19 explains log data equalization operation in the log data equalization method of the second embodiment of the invention.

(4) As indicated in FIG. 19, the CM 4-1 writes the log data CM #0 transferred to the buffer area of the memory 40*b* to the log data area of the system disk drive 453 (454) installed in the CM 4-1.

When log data transfer and write processing between the CMs 4-0 and 4-1 ends, equalization processing is complete. Thus log data is transferred between a pair of CMs and each CM shares log data with another CM, so that although system disk drives are provided within CMs, even if an abnormality occurs in one CM, the log data for the anomalous CM can be output from a remaining normal CM, and diagnostics and preventive maintenance of the anomalous CM are possible. Because there is a single data transfer destination, the time required for equalization of log data can be reduced, and the capacity of log data storage areas on system disks can be decreased.

This equalization processing is the same as in FIG. 13 and FIG. 14. The only difference is that, when in step S12 of FIG. 13 the distribution destinations are determined, the backup table 470-1 of FIG. 15 is referenced, and the backup CM is determined to be the distribution destination.

Third Embodiment of Log Data Equalization Processing

Next, the log data equalization control of a third embodiment of the invention is explained. When the equalization processing of the second embodiment is performed, if an abnormality occurs in one CM, log data can be output using another CM. However, if an abnormality also occurs in another CM, there are cases in which log data output is impossible. In this third embodiment, when an abnormality occurs in one CM, processing is performed to transfer the log data of the anomalous CM already existing in a normal CM to another normal CM.

By means of this equalization processing, even when an abnormality occurs in still another CM, equalization of log data is maintained, and data output is possible without loss of log data. Log data equalization processing upon occurrence of a CM abnormality is explained using FIG. 20 and FIG. 21.

Figure 20:
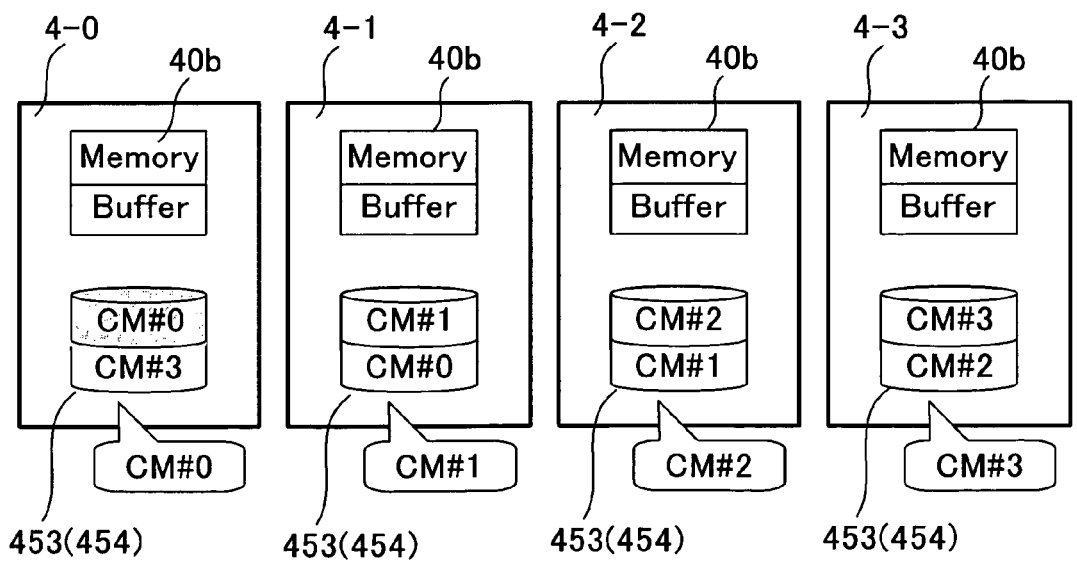
FIG. 20 explains log data storage states in the log data equalization method of a third embodiment of the invention.

(1) As shown in FIG. 20, in a state in which each CM stores the log data of one other CM as according to the second embodiment, if an abnormality is detected in the CM 4-0, the CMs 4-1 to 4-3 are notified of this fact.

Figure 21:
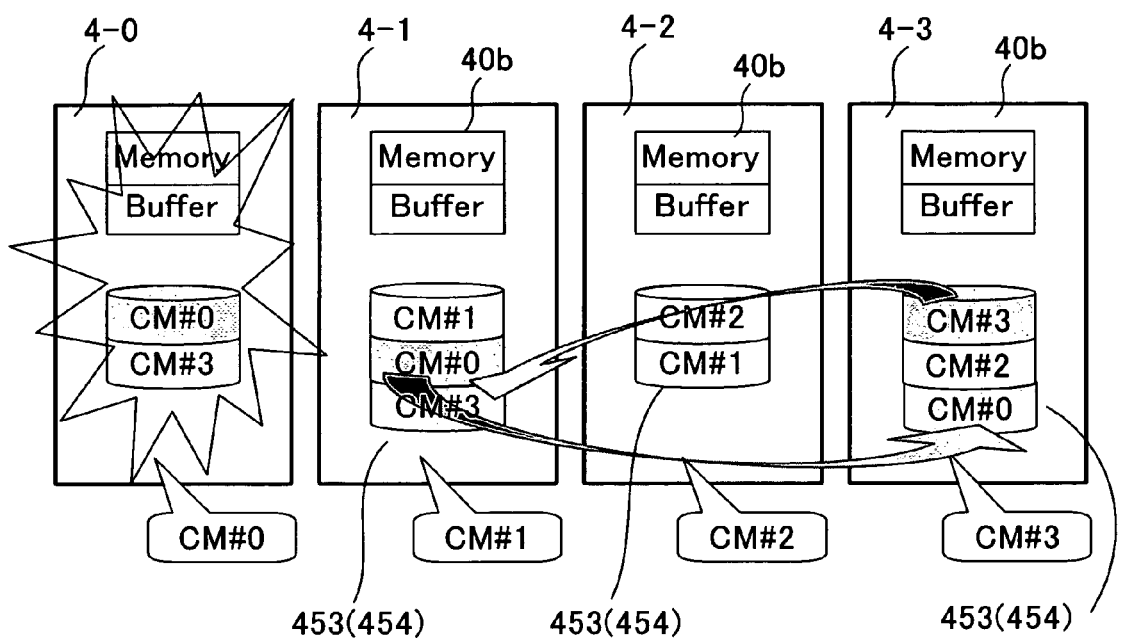
FIG. 21 explains log data equalization processing at the time of a controller abnormality in the log data equalization method of the third embodiment of the invention.

(2) As shown in FIG. 21, the backup table 370-1 of FIG. 15 is used to ascertain the CM numbers of the log data equalization data source CM 4-3 of the log data CM #3 of the other CM which is held on the system disk of the anomalous CM 4-0, as well as of the equalization data destination CM-1 which stores the log data CM #0 of the anomalous CM 4-0. The log data CM #3 of CM 4-3 is then transferred from the equalization log data source CM 4-3 for the anomalous CM 4-0 to the equalization log data destination CM 4-1 for the anomalous CM 4-0.

After completion of processing for transfer and writing of the log data CM #3 of CM 4-3 to the system disk 453 (454) of CM 4-1, the equalization log data CM #0 for CM 4-0 on the system disk 453 (454) of CM 4-1 is transferred to CM 4-3. When CM 4-3 completes processing for transfer and writing of the log data CM #0 to the system disk 453 (454), the log data is in the equalized state.

Thus even if an abnormality occurs in still another CM, equalization of the log data is maintained, and data output is possible without loss of log data.

Figure 22:
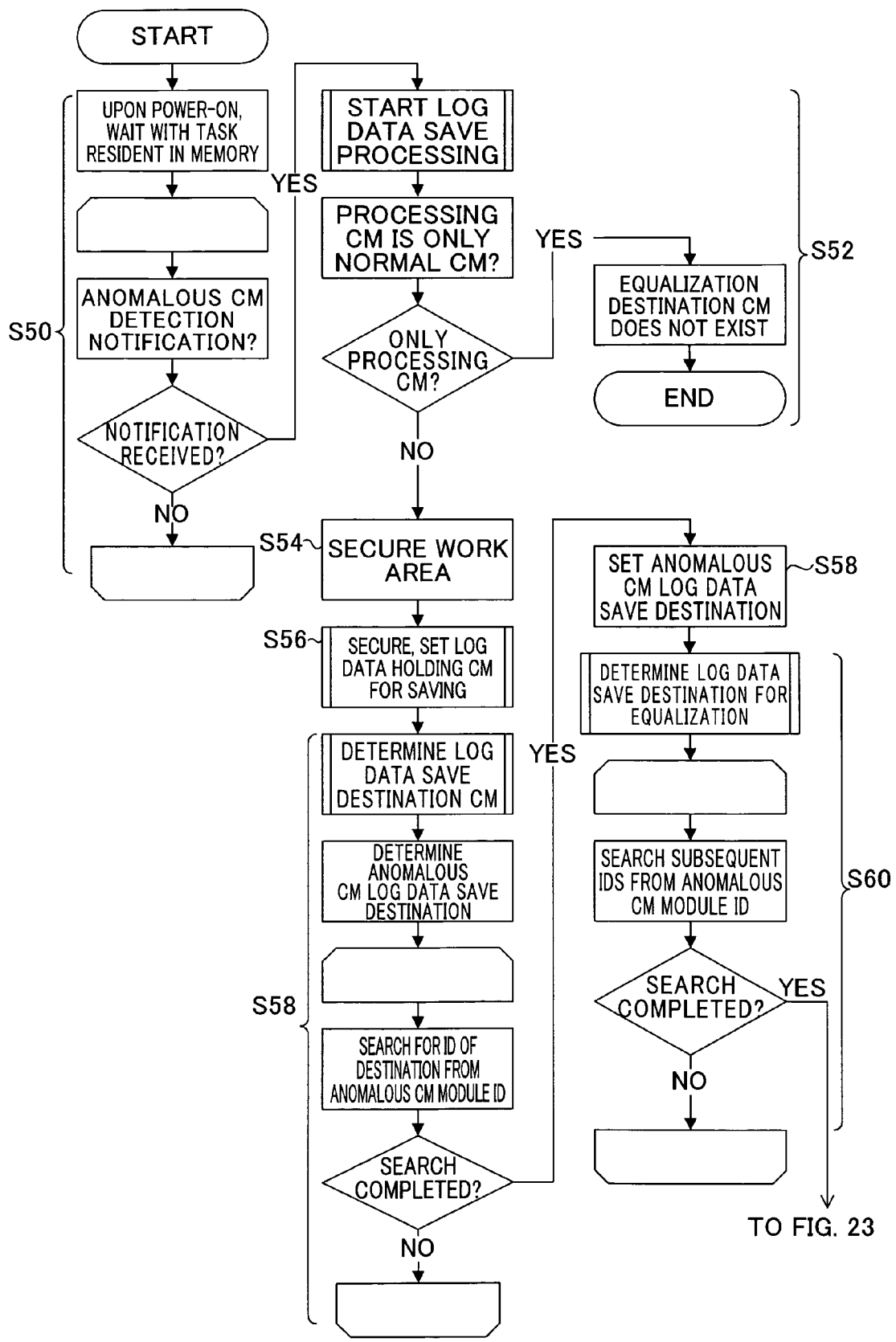
FIG. 22 shows the flow of processing (1) of a master controller in the log data equalization method of the third embodiment of the invention.
Figure 23:
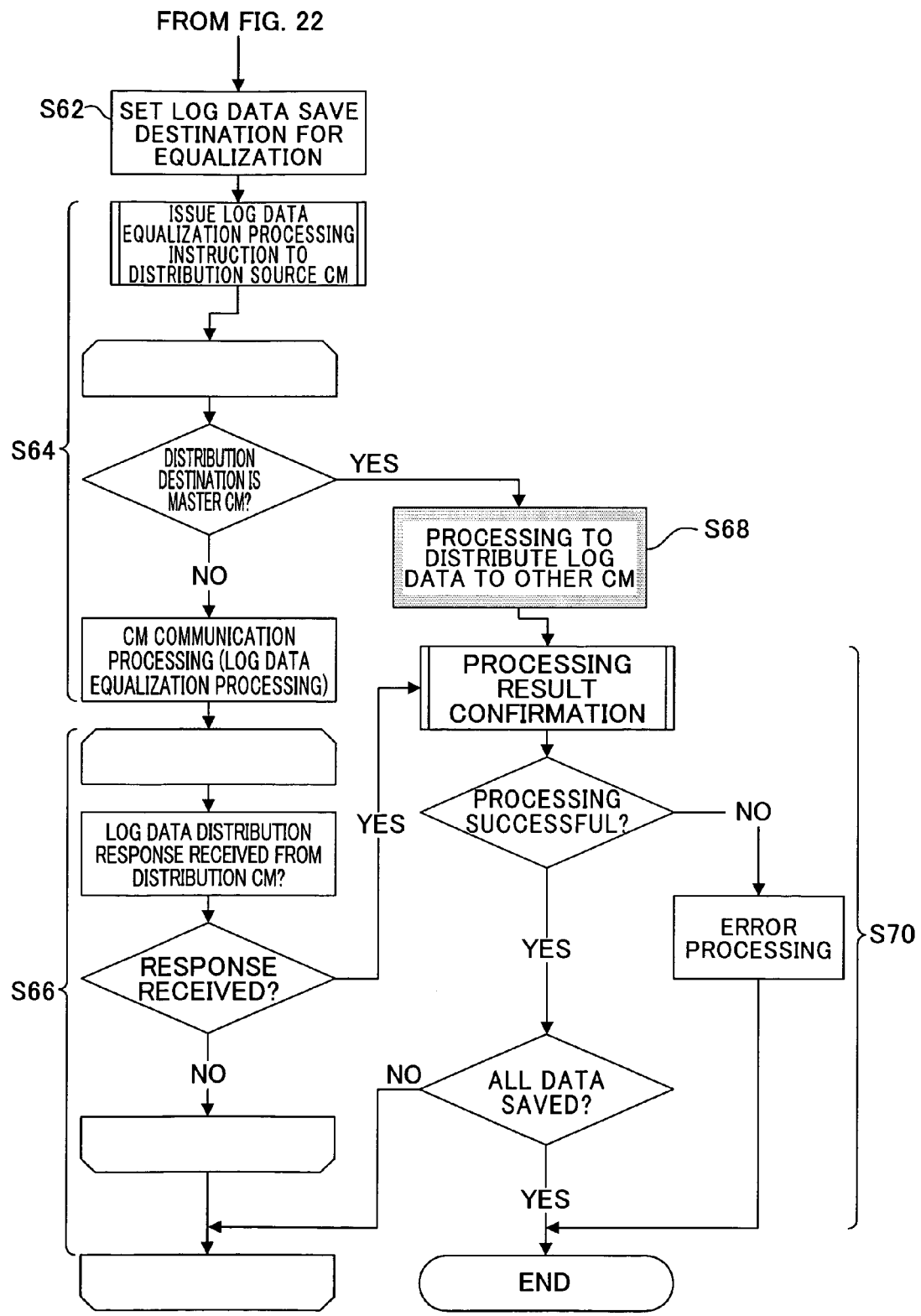
FIG. 23 shows the flow of processing (2) of a master controller in the log data equalization method of the third embodiment of the invention.
Figure 24:
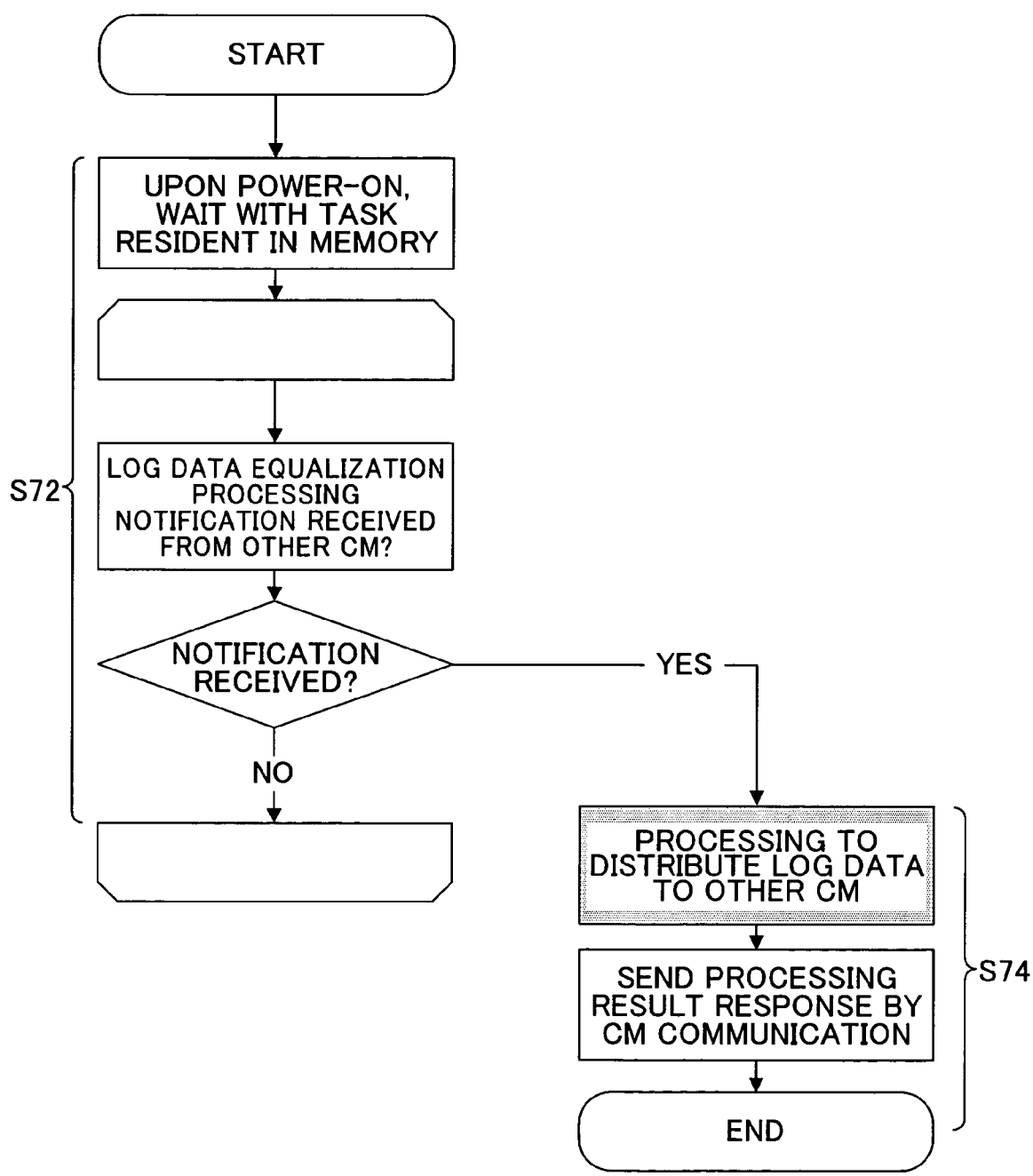
FIG. 24 shows the flow of distribution processing of a distribution source controller in the log data equalization method of the third embodiment of the invention; and, FIG. 25 shows the configuration of a storage system of the prior art.

FIG. 22 through FIG. 24 show the flow of processing in the log data equalization method of the third embodiment of the invention. That is, FIG. 22 and FIG. 23 show the flow of log data distribution processing at the time of occurrence of a controller abnormality in this embodiment, and FIG. 24 shows the flow of log data storage processing at the distribution destination. First, log data distribution processing is explained using FIG. 22 and FIG. 23.

(S50) First, when an abnormality is detected in one of the four CMs 4-0 to 4-3 in FIG. 20, the CM performing distribution processing (here called the master CM) is assumed to be determined. When power is turned on, the control unit 40a of this master CM starts the processing task in the memory, and waits. That is, the control unit 40a judges whether notification of abnormality detection has been received from an anomalous CM.

(S52) Upon receiving abnormality notification, the control unit 40a starts log data save processing, and first judges whether the processing CM (master CM) is the only normal CM. That is, a judgment is made as to whether an abnormality has occurred in the three CMs of FIG. 20. If only the processing CM is normal, then an equalization destination CM does not exist, and so processing ends.

(S54) If on the other hand the control unit 40a judges that the processing CM is not the only normal CM, then preparations for save processing are begun. That is, the control unit 40a of the master CM secures a work area set for saved information in the memory 40b.

(S56) Next, the control unit 40a ascertains the CM holding the log data to be saved. That is, the backup table 470-1 of the configuration information definition table in FIG. 15 is used to determine the equalization destination and equalization source of the log data that had been managed by the anomalous CM, and to set the work area. For example, if the CM 4-0 has an abnormality, the equalization destination is CM 4-1, and the equalization source is CM-3. By this means, the CMs storing the log data CM #0 and CM #3 held by the anomalous CM can be determined. In other words, the save source (distribution source) CM is determined.

(S58) Next, judgment of the log data save destination CM is begun. First the save destination CM for the log data of the anomalous CM (in FIG. 21, CM #0) is judged. That is, the CM number of the anomalous CM is used to reference the above-described backup table 470-1 to search for the save destination CM, which is set in the work area. For example, as indicated in FIG. 21, if the anomalous CM is CM-0, then CM 4-3 is linked in FIG. 15, and so CM 4-3 is set as the save destination for the log data CM #0 of the anomalous CM 4-0.

(S60) Similarly, the save destination CM for the log data being held by the anomalous CM (in FIG. 21, CM #3) is judged. That is, the CM number of the anomalous CM is used to reference the above-described backup table 470-1 to search for the save destination CM. For example, if the anomalous CM is CM 4-0 as in FIG. 21, then CM 4-1 is linked in FIG. 15, and so CM 4-1 is determined to be the save destination for the equalization log data CM #3 which had been held by the anomalous CM 4-0.

(S62) In FIG. 23, the save destination (distribution destination) CM for the equalization log data is set in the work area.

(S64) Next, an instruction is issued for equalization processing of the log data in question to the distribution source CM. First a judgment is made as to whether the distribution source (determined in step S56) is the master CM. If not the master CM, a request to perform log data equalization processing through communication between CMs is issued to the distribution source CM.

(S66) The control unit 40a of the master CM waits for a log distribution response (equalization processing result) from the distribution source CM, and upon receiving the log data distribution response, advances to step S70.

(S68) If on the other hand the distribution source is judged to be the master CM in step S64, the control unit 40a of the master CM performs processing to distribute the log data to the save destination (distribution destination) CM. This processing is the same as the processing in FIG. 13 and FIG. 14, and an explanation is omitted.

(S70) In steps S66 and S68, when distribution processing is completed the control unit 40a ascertains the processing results. If the processing results do not indicate success, error processing is performed, an error result is left, and processing ends. If the processing results indicate success, the control unit 40a judges whether all the data in question has been saved. If not all the data has been saved, processing returns to step S66 and the next distribution processing is performed. If however all the data in question has been saved, processing ends.

Next, CM distribution processing by the destination of a distribution request is explained using FIG. 24.

(S72) When power is turned on, the control unit 40a of the CM which is the distribution request destination residents the processing task in the memory, and waits. That is, the control unit 40a monitors reception of a log data distribution processing request from the master CM via the front-end router 6-0 (6-1).

(S74) Upon receiving notification, the control unit 40a executes the processing for distribution of the log data to the distribution destination CM explained in FIG. 13 and FIG. 14. After the end of distribution processing, the processing results are returned to the master CM via the front-end router 6-0 (6-1), and processing ends.

In this way, even when an abnormality occurs in a plurality of CMs, a normal CM can hold the log data of all the CMs, including the anomalous CMs, to prevent loss of log data. And because the configuration information definition table is referenced and the distribution source and distribution destination for save processing are determined when saving is performed, save distribution processing is facilitated.

Other Embodiments

In the above-described embodiment, log data output processing was explained for an example of four control modules; but similar application is possible when there are three or more control modules. The number of channel adapters and disk adapters within control modules can be increased or decreased as necessary.

As the disk drives, hard disk drives, optical disc drives, magneto-optical disc drives, and other storage devices can be employed. Further, the configuration of the storage system and controllers (control modules) is not limited to that of FIG. 1, and application to other configurations (such as for example that of FIG. 25) is possible.

In the above, embodiments of this invention have been explained, but various modifications can be made within the scope of the invention, and these modifications are not excluded from the scope of the invention.

Because system disks are incorporated into control modules, even if problems occur in a path between a control module and a disk storage device, a control module and another path can be used to read firmware and apparatus configuration backup data from a system disk, and operation using other paths is possible; further, log data can be read and written, so that analysis upon occurrence of a fault and diagnostics for fault prevention are possible.

Moreover, system disks are incorporated into control modules, and the log data in one control module is stored in the system disks of other installed control modules in equalization processing, so that even if an abnormality occurs in one control module, the log data of the one control module can be output by another control module, and a highly reliable storage system which can cope with anomalies occurring at any location can be provided.

What is claimed is:

1. A data storage system comprising:
a plurality of disk storage devices which store data; and
a plurality of control modules, connected to said plurality of disk storage devices, which control access to said disk storage devices according to access instructions from a higher-level system,
wherein each of said control modules comprises:
a memory having a cache area which stores a portion of the data stored by said disk storage devices;
a control unit, which performs said access control;
a first interface unit, which controls the interface with said higher-level system;
a second interface unit, which controls the interface with said plurality of disk storage devices; and
a system disk unit, connected to said control unit, which stores at least the log data of said control unit,
and wherein one control module executes log data equalization control which transfers the log data of said system disk unit to another control module and stores in the system disk unit of the other control module.

2. The data storage system according to claim 1, wherein said one control module receives the log data of the system disk unit of said other control module, and stores the log data of said other control module in the system disk unit of said one control module.

3. The data storage system according to claim 1, wherein each of said control modules distributes log data of the system disk unit of said control module to other control modules among said plurality of control modules, and stores the log data of all control modules on the system disk units of said plurality of control modules.

4. The data storage system according to claim 1, wherein said plurality of control modules comprise four or more control modules,
and wherein each control module stores, on the system disk unit of said control module, the log data of said control module, and log data of a backup destination control module.

5. The data storage system according to claim 1, wherein, upon storage of said log data in the system disk unit of said one control module, said one control module executes equalization processing comprising transfer of log data to said other control module.

6. The data storage system according to claim 1, wherein said one control module stores log data of said one control module in a log data area of said one control module in said system disk unit, and stores the log data of said one control module and log data of said other control module in an equalization log data area of said system disk unit.

7. The data storage system according to claim 1, wherein said one control module reads the log data of said one control module in the system disk unit of said one control module, to a buffer area in the memory, and transfers said log data to a buffer area in the memory of said other control module,
and wherein said other control module writes the log data of said one control module in said memory buffer area to the system disk drive.

8. A data storage system, comprising:
a plurality of disk storage devices which store data; and
a plurality of control modules, connected to said plurality of disk storage devices, which control access to said disk storage devices according to access instruction from a higher-level system,
wherein each of said control modules comprises:
a memory having a cache area which stores a portion of the data stored by said disk storage devices;
a control unit, which performs said access control;
a first interface unit, which controls the interface with said higher-level system;
a second interface unit, which controls the interface with said plurality of disk storage devices; and
a system disk unit, connected to said control unit, which stores at least log data of said control unit,
and wherein one control module executes log data equalization control which transfers the log data of said system disk unit to another control module and stores in the system disk unit of the other control module,
wherein said plurality of control modules comprise four or more control modules,
and wherein each control module stores, on the system disk unit of said control module, the log data of said control module, and log data of a backup destination control module
wherein, one control module among said four or more control modules detects an abnormality in one other control module, searches for the equalization destination and equalization source of the log data of said one control module and of the log data of the backup destination control module stored in the system disk unit of said one other control module, determines the distribution source, determines the distribution destination from the backup destination, distributes, from the distribution source control module to said distribution destination control module, distributes a copy of the log data of said one control module and a copy of the log data of said backup destination control module stored in the system disk unit of said one other control module from said source control module system to said destination control module.

9. A log data equalization control method for a storage control apparatus, having a plurality of control modules connected to a plurality of disk storage devices which store data and which control access to said disk storage devices according to access instructions from a higher-level system, each of said control modules having memory with a cache area which stores a portion of the data stored by said disk storage devices, a control unit which performs said access control, a first interface unit which controls the interface with said higher-level system, a second interface unit which controls the interface with said plurality of disk storage devices, and a system disk unit, connected to said control unit, which stores at least the log data of said control unit, said method comprising the steps of:

transferring log data of said system disk unit of one control module to another control module; and, executing log data equalization control which stores said transferred log data in the system disk unit of said other control module.

10. The log data equalization control method for a storage control apparatus according to claim 9, further comprising:

a step of receiving the log data of the system disk unit of said other control module by said one control module; and a step of storing the log data of said other control module in the system disk unit of said one control module.

11. The log data equalization control method for a storage control apparatus according to claim 9, wherein said transfer step comprises a step of distributing log data of a system disk unit of each control module to other control modules among said plurality of control modules, and wherein said equalization processing step comprises a step of storing log data of all control modules in the system disk units of said plurality of control modules.

12. The log data equalization control method for a storage control apparatus according to claim 9, wherein said equalization processing step comprises a step of storing, in a system disk unit of each control module, log data for said control module and log data for a backup destination control module, by each control module among four or more control modules.

13. The log data equalization control method for a storage control apparatus according to claim 9, wherein said transfer step comprises a step, upon storage of said log data in the system disk unit of said one control module, of executing transfer of log data to said other control module.

14. The log data equalization control method for a storage control apparatus according to claim 9, wherein said equalization processing step comprises:

a step of storing log data of said one control module in a log data area of said one control module in said system disk unit; and a step of storing log data of said one control module and log data of said other control module in an equalization log data area of said system disk unit.

15. The log data equalization control method for a storage control apparatus according to claim 9, wherein said transfer step comprises:

a step of reading, by said one control module, the log data of said one control module in the system disk unit of said one control module, to a buffer area in memory; and a step of transferring said log data to a buffer area in memory of said other control module, and said equalization processing step comprises a step of writing, by said other control module, the log data of said one control module in said memory buffer area to the system disk drive.

16. A log data equalization control method for a storage control apparatus, having a plurality of control modules connected to a plurality of disk storage devices which store data and which control access to said disk storage devices according to access instructions from a higher-level system, each of said control modules having memory with a cache area which stores a portion of the data stored by said disk storage devices, a control unit which performs said access control, a first interface unit which controls the interface with said higher-level system, a second interface unit which controls the interface with said plurality of disk storage devices, and a system disk unit, connected to said control unit, which stores at least log data of said control unit, said method comprising the steps of:

transferring the log data of said system disk unit of one control module to another control module; and executing log data equalization control which stores said transferred log data in the system disk unit of said other control module, wherein said equalization processing step comprises a step of storing, in a system disk unit of each module, the log data for said control module and log data for a backup destination control module, by each control module among four or more control modules, and wherein said method further comprising the steps of:

detecting an abnormality in one other control module among said four or more control modules by one control module;

searching for the equalization destination and equalization source of the log data of said one control module stored in the system disk unit of said one other control module and of the log data of the backup destination control module, determining the distribution source, and determining the distribution destination from the backup destination;

distributing, from the distribution source control module to said distribution destination control module, a copy of the log data of said one control module stored in the system disk unit of said one other control module and a copy of the log data of said backup destination control module; and storing said log data in said system disk unit of said control module.

* * * * *

UNITED STATES PATENT AND TRADEMARK OFFICE
CERTIFICATE OF CORRECTION

PATENT NO. : 7,426,658 B2  
APPLICATION NO. : 11/231932  
DATED : September 16, 2008  
INVENTOR(S) : Masahiro Yoshida et al.

It is certified that error appears in the above-identified patent and that said Letters Patent is hereby corrected as shown below:

Column 21, Line 24, before "log" delete "the".

Signed and Sealed this

Thirtieth Day of June, 2009

JOHN DOLL  
*Acting Director of the United States Patent and Trademark Office*